(12) United States Patent
Xu

(10) Patent No.: US 12,547,934 B2
(45) Date of Patent: Feb. 10, 2026

(54) TECHNIQUES FOR PROVIDING SECURE FEDERATED MACHINE-LEARNING

(71) Applicant: Visa International Service Association, San Francisco, CA (US)

(72) Inventor: Minghua Xu, Austin, TX (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 924 days.

(21) Appl. No.: 17/782,063

(22) PCT Filed: Dec. 3, 2019

(86) PCT No.: PCT/US2019/064279
§ 371 (c)(1),
(2) Date: Jun. 2, 2022

(87) PCT Pub. No.: WO2021/112831
PCT Pub. Date: Jun. 10, 2021

(65) Prior Publication Data
US 2023/0008976 A1 Jan. 12, 2023

(51) Int. Cl.
*G06N 20/00* (2019.01)

(52) U.S. Cl.
CPC ................... *G06N 20/00* (2019.01)

(58) Field of Classification Search
CPC ....... G06N 20/00; G06F 21/57; G06F 21/606; G06F 21/6245; H04L 9/0894;
(Continued)

(56) References Cited

U.S. PATENT DOCUMENTS

| | | | |
|---|---|---|---|
| 10,956,584 B1 * | 3/2021 | Heaton | G06F 9/3802 |
| 11,281,975 B1 * | 3/2022 | Isaksson | G06F 3/0486 |

(Continued)

FOREIGN PATENT DOCUMENTS

| | | |
|---|---|---|
| CN | 110197285 A | 9/2019 |
| CN | 110428056 A | 11/2019 |

(Continued)

OTHER PUBLICATIONS

Written Opinion, mailed Feb. 29, 2024, for Singapore Patent Application No. SG11202250014J, 6 pages.
(Continued)

*Primary Examiner* — Meng Vang
(74) *Attorney, Agent, or Firm* — Kilpatrick Townsend & Stockton LLP

(57) ABSTRACT

Embodiments of the invention are directed to systems, methods, and devices for securely performing federated tasks (e.g., the generation and utilizing of machine-learning models). A secure platform computer may operate a secure memory space. Entities participating in a federated project may transmit respective portions of project data defining the federated project. Each entity may provide their respective (encrypted) data sets for the project that in turn can be used to generate a machine-learning model in accordance with the project data. The machine-learning model may be stored in the secure memory space and accessed through an interface provided by the secure platform computer Utilizing the techniques discussed herein, a machine-learning models may be generated and access to these models may be restricted while protect each participant's data set from being exposed to the other project participants.

20 Claims, 9 Drawing Sheets

(58) Field of Classification Search
CPC ....... H04L 9/3239; H04L 9/3247; H04L 9/50; H04L 9/0825
USPC .......................................................... 713/193
See application file for complete search history.

(56) References Cited

U.S. PATENT DOCUMENTS

| | | | |
|---|---|---|---|
| 2017/0364831 | A1 | 12/2017 | Ghosh et al. |
| 2018/0173719 | A1* | 6/2018 | Bastide ................. G06F 40/166 |
| 2018/0322386 | A1 | 11/2018 | Sridharan et al. |
| 2019/0012592 | A1 | 1/2019 | Beser et al. |
| 2019/0042937 | A1 | 2/2019 | Sheller et al. |
| 2019/0179916 | A1* | 6/2019 | Sivaji ...................... G06F 16/34 |
| 2019/0220836 | A1* | 7/2019 | Caldwell ................... H04L 9/50 |
| 2019/0236598 | A1 | 8/2019 | Padmanabhan |
| 2019/0287026 | A1 | 9/2019 | Calmon et al. |
| 2019/0394257 | A1* | 12/2019 | Estes ..................... G06F 40/166 |
| 2020/0111067 | A1* | 4/2020 | Strickon ............ G06Q 20/3674 |
| 2020/0167775 | A1* | 5/2020 | Reese .............. G06Q 20/38215 |
| 2020/0302468 | A1* | 9/2020 | Karuppan ............... H04L 63/12 |

FOREIGN PATENT DOCUMENTS

| | | |
|---|---|---|
| WO | 2018/209222 A1 | 11/2018 |
| WO | 2019073000 | 4/2019 |

OTHER PUBLICATIONS

Application No. EP19955051.8, Extended European Search Report, Mailed on Oct. 25, 2022, 10 pages.

Notice of Decision to Grant, mailed Jul. 16, 2023, for Chinese Patent Application No. CN201980102752.X , 4 pages.

Office Action, mailed Apr. 1, 2023, for Chinese Patent Application No. CN201980102752.X , 16 pages.

Application No. CN201980102752.X , Office Action, Mailed on Oct. 13, 2022, 18 pages.

Examination Report mailed Nov. 26, 2024, for European Patent Application No. 19 955 051.8, 7 pages.

Application No. PCT/US2019/064279 , International Search Report and Written Opinion, Mailed on Sep. 1, 2020, 11 pages.

* cited by examiner

TECHNIQUES FOR PROVIDING SECURE FEDERATED MACHINE-LEARNING

CROSS-REFERENCE TO RELATED APPLICATIONS

This is a 371 application based on PCT Patent Application No. PCT/US2019/064279, filed on Dec. 3, 2019, the disclosure of which is herein incorporated by reference in its entirety for all purposes.

BACKGROUND

Machine-learning algorithms are utilized in a variety of contexts. Conventionally, should multiple entities wish to train and utilize a machine-learning model, they would be required to exchange their data. While these entities may have valid reasons for working with one another to generate a machine-learning model, it may not be advantageous or desirable for each entity to have access to the other's data. Depending on the type of data utilized, sharing such data may raise privacy concerns. There may be additional contexts outside of machine-learning in which multiple entities may desire to perform a task without exchanging their respective data.

Embodiments of this disclosure address these and other problems, individually and collectively.

SUMMARY

One embodiment of the invention is directed to a method. The method may comprise receiving, by a secure platform computer operating a secure memory space, a first portion and a second portion of project data corresponding to a distributed project involving a first entity and a second entity. In some embodiments, the first portion of the project data may correspond to the first entity and the second portion of the project data corresponding to the second entity. The method may further comprise receiving, by the secure platform computer, a first data set of the first entity and a second data set of the second entity. The method may further comprise generating, by the secure platform computer, a machine-learning model based at least in part on the first data set, the second data set, and the project data. The method may further comprise providing, by the secure platform computer, access to the machine-learning model to the first entity and the second entity, the machine-learning model being stored within the secure memory space.

Another embodiment of the invention is directed to a computing device comprising one or more processors and a secure platform computer operating a secure memory space. The secure memory space may comprise computer-executable instructions that, when executed by the one or more processors, causes the secure platform computer to perform operations. The operations may comprise receiving a first portion and a second portion of project data corresponding to a distributed project involving a first entity and a second entity. In some embodiments, the first portion of the project data corresponding to the first entity and the second portion of the project data corresponding to the second entity. The operations may further comprise receiving a first data set of the first entity and a second data set of the second entity. The operations may further comprise generating a machine-learning model based at least in part on the first data set, the second data set, and the project data. The operations may further comprise providing access to the machine-learning model to the first entity and the second entity, the machine-learning model being stored within the secure memory space.

Further details regarding embodiments of the invention can be found in the Detailed Description and the Figures.

DETAILED DESCRIPTION

Figure 1:
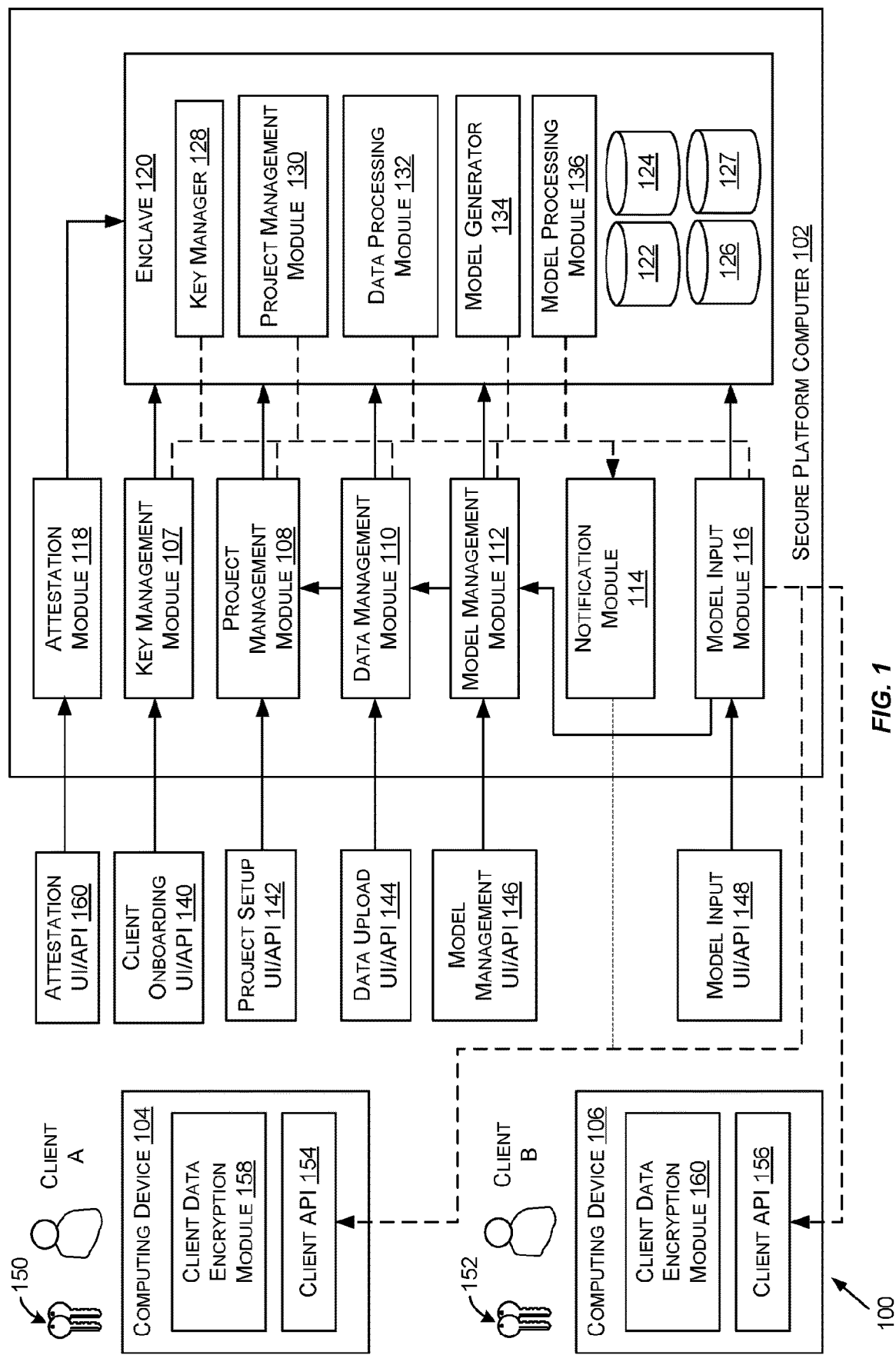
FIG. 1 shows a block diagram of a system for performing a secure federated task, according to some embodiments.

Embodiments of the present invention are directed to performing a federated task utilizing a secure platform computer. In some embodiments, the task may be related to generating and utilizing a machine-learning model. Although examples herein are directed to situations in which a machine-learning model is generated, it should be appreciated that the secure platform computer may be utilized in other contexts other than machine-learning in order to provide a secure task execution environment for two or more entities.

Two or more entities may utilize the secure platform computer disclosed herein to define a project and to provide their respective project data. Project data from each entity may be stored by the secure platform computer in a secure memory space (e.g., an enclave managed by the chipset of the secure platform computer). In some embodiments, this secure memory space may be accessible only to the chip set and/or applications and/or modules executing within the secure memory space and inaccessible to other processes and/or systems. By utilizing the secure platform computer, each entity can contribute to the project while ensuring that their data is kept private.

Prior to discussing specific embodiments of the invention, some terms may be described in detail.

The term "computing device" generally refers to a device that performs computations. A computing device may also provide remote communication capabilities to a network. Examples of remote communication capabilities include using a mobile phone (wireless) network, wireless data network (e.g. 3G, 4G or similar networks), Wi-Fi, Wi-Max, or any other communication medium that may provide access to a network such as the Internet or a private network. Examples of user devices include mobile phones (e.g. cellular phones), PDAs, tablet computers, net books, laptop computers, personal music players, hand-held specialized readers, etc. Further examples of user devices include wearable devices, such as smart watches, fitness bands, ankle bracelets, rings, earrings, etc., as well as automobiles with remote communication capabilities. A user device may comprise any suitable hardware and software for performing such functions, and may also include multiple devices or components (e.g. when a device has remote access to a network by tethering to another device—i.e. using the other device as a modem—both devices taken together may be considered a single user device).

A "federated project" (also referred to as "a project") is a collaborative enterprise that is planned and designed by two or more entities to achieve a particular aim.

A "secure platform computer" may include one or more computing devices. In some embodiments, the secure platform computer can be a large mainframe, a minicomputer cluster, or a group of server computers functioning as a unit. The secure platform computer may be coupled to one or more databases and may include any hardware, software, other logic, or combination of the preceding, for servicing requests from one or more client computers. The secure platform computer may comprise one or more computational apparatuses and may use any of a variety of computing structures, arrangements, and compilations for servicing the requests from one or more client computers/applications. In some embodiments, a secure platform computer may be configured to manage one or more secure memory spaces.

A "secure memory space" may include an isolated region of memory that is accessed only with code that is executed within the same secure memory space. Secure memory spaces may be initialized and managed by a chip set such that content of the secure memory space is cryptographically hashed by a private key known only to the chip set. Content of the secure memory space may be protected even from privileged software such as virtual machine monitors, BIOS, or operating systems. A chip set may enforce access control for accessing content in the secure memory space.

"Software Guard Extensions" (SGX) are a set of security-related instruction codes that are built in to some central processing units (CPUs). These guard extensions allow user-level and operating system code to define private regions of memory called "enclaves" (e.g., each an example of a secure memory space) whose contents are protected and unable to be either read or saved by any process outside the enclave itself, including processes running at higher privilege levels. SGX may involve encryption by the CPU of the enclave. The enclave is decrypted on the fly only within the CPU itself, and even then, only for code and data running from within the enclave itself. The enclave contents are unable to be read by any code outside the enclave, other than in its encrypted form.

The term "chip set" may include a set of electronic components in an integrated circuit that manage data flow between a processor, memory and peripherals of a computing device. A chip set may include code that may be executed to initialize and manage access to any number of secure memory spaces.

A "protected application" or "protected module" may include a software application or module that is executed within a secure memory space. The execution of functionality of the protected application and/or modules may be managed by a chip set such that function/method calls of the application/modules may access data contained in a secure memory space.

A "client computer" may be a computing device operated by or on behalf of a client. A client can be any suitable entity.

An "entity" may include an individual, a company, a financial institution, a research organization, a medical organization, or the like.

A "cryptographic key" may include a piece of information that is used in a cryptographic algorithm to transform input data into another representation. A cryptographic algorithm can be an encryption algorithm that transforms original data into an alternate representation, or a decryption algorithm that transforms encrypted information back to the original data. Examples of cryptographic algorithms may include triple data encryption standard (TDES), data encryption standard (DES), advanced encryption standard (AES), etc.

A "cryptographic key pair" may include a pair of linked cryptographic keys. For example, a key pair can include a public key and a corresponding private key. In a cryptographic key pair, a first cryptographic key (e.g., a public key) may be used to encrypt a message, while a second cryptographic key (e.g., a private key) may be used to decrypt the encrypted message. Additionally, a public key may be able to verify a digital signature created with the corresponding private key. The public key may be distributed throughout a network in order to allow for verification of messages signed using the corresponding private key. Public and private keys may be in any suitable format, including those based on RSA or elliptic curve cryptography (ECC). In some embodiments, a key pair may be generated using an asymmetric key pair algorithm.

An "immutable ledger" may refer to a ledger of transaction which is unchangeable. An example of an immutable ledger may be a "blockchain ledger." A "blockchain ledger" is a series of records maintained according to a blockchain protocol. A full copy of a blockchain ledger may include every transaction ever executed by the system. Each entry (e.g., block) in the ledger may contain a hash of the previous entry. This has the effect of creating a chain of blocks from the genesis block to a current block. Each block is guaranteed to come after the previous block chronologically because the previous block's hash would otherwise not be known. Each block is also computationally impractical to modify once it has been in the chain for a while because every block after it would also have to be regenerated. These properties make a blockchain ledger relatively secure and tamper resistant.

"Project data" may be any suitable data that defines a project between two or more entities. For example, project data may include permissive use information defining a task (e.g., training and/or maintaining a machine-learning model using one or more machine-learning algorithms), one or more schemas defining the organization or structure of data provided by one or more corresponding entities, transformation data defining how a data set provided by one entity may be transformed into a different format, or any suitable data that can be utilized to define a project and/or one or more operations associated with the project.

"Permissive use information" may include any suitable information that defines a permissive use for one or more data sets corresponding to one or more entities.

A "schema" may refer to one or more documents that define the organization or structure of data. A schema may be in any suitable format. For example, a schema may be provided in a mark up language such as XML to define an object, a data type/structure, an application interface, or the like.

A "usage policy" may include one or more rules defining how particular data is to be used. A usage policy may include one or more rules for restricting data usage outside of one or more permitted uses (e.g., as provided in corresponding permissive use information provided by the one or more entities).

A "machine-learning algorithm" may be utilized to build a mathematical model based on sample data, known as "training data," in order to make predictions or decisions wihtout being explicitly programmed to perform the task. Some machine-learning algorithms include supervised learning algorithms (e.g., classification algorithms, regression algorithms, decision trees, random forest, etc. which utilize labeled training data), semi-supervised learning algorithms (e.g., algorithms which utilize training data in which some training examples are labeled and some are not), unsupervised learning algorithms (e.g., cluster analysis algorithms, k-nearest neighbor, Apriori, etc.), reinforced learning algorithms (e.g., Markov decision processes, etc.).

A "machine-learning model" may be a mathematical representation of a real-world process. In some embodiments, a machine-learning model be a mathematical model that is generated (e.g., trained) utilizing training data and a machine-learning algorithm. Some example models include, artificial neural networks, recurrent neural networks, decision trees, bayesian networks, and the like.

A "task request" may be data that indicates a request for performance of a task. A task request may be in any suitable form.

An "output request" may be data that indicates a request for output data. An output request may be a type of task request and may be in any suitable form.

An "application programming interface" (API) may be an interface or communication protocol between a client and a server. In some embodiments, an application programming interface may define formats for specific requests and corresponding responses. An API can take many forms, but can often include specifications for routines, data structures, object classes, variable, or remote calls. An API may be for a web-based system, an operating system, a database system, computer hardware, or a software library, to name a few.

An "attestation process" may refer to a process for validating that data exists and/or is valid. The goal of attestation is to prove to a remote party that an operating system and/or application software are intact and trustworthy.

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "processor" may refer to any suitable data computation device or devices. A processor may comprise one or more microprocessors working together to accomplish a desired function. The processor may include a CPU that comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

"Payment credentials" may include any suitable information associated with an account (e.g. a payment account and/or payment device associated with the account). Such information may be directly related to the account or may be derived from information related to the account. Examples of account information may include a PAN (primary account number or "account number"), user name, expiration date, CW (card verification value), dCW (dynamic card verification value), CVV2 (card verification value 2), CVC3 card verification values, etc. CVV2 is generally understood to be a static verification value associated with a payment device. CW2 values are generally visible to a user (e.g., a consumer), whereas CVV and dCVV values are typically embedded in memory or authorization request messages and are not readily known to the user (although they are known to the issuer and payment processors). Payment credentials may be any information that identifies or is associated with a payment account. Payment credentials may be provided in order to make a payment from a payment account. Payment credentials can also include a user name, an expiration date, a gift card number or code, and any other suitable information.

A "resource provider" may be an entity that can provide a resource such as goods, services, information, and/or access. Examples of a resource provider includes merchants, access devices, secure data access points, etc. A "merchant" may typically be an entity that engages in transactions and can sell goods or services, or provide access to goods or services. A resource provider may operate a computer to perform operations, which can also be generically referred to as a "resource provider computer".

An "acquirer" may typically be a business entity (e.g., a commercial bank) that has a business relationship with a particular merchant or other entity. Some entities can perform both issuer and acquirer functions. Some embodiments may encompass such single entity issuer-acquirers. An acquirer may operate an acquirer computer, which can also be generically referred to as a "transport computer".

An "authorizing entity" may be an entity that authorizes a request. Examples of an authorizing entity may be an issuer, a governmental agency, a document repository, an access administrator, etc. An "issuer" may typically refer to a business entity (e.g., a bank) that maintains an account for a user. An issuer may also issue payment credentials stored on a user device, such as a cellular telephone, smart card, tablet, or laptop to the consumer. An authorizing entity may operate a computer to perform operations, which can also be generically referred to as an "authorizing entity computer".

An "access device" may be any suitable device that provides access to a remote system. An access device may also be used for communicating with a merchant computer, a transaction processing computer, an authentication computer, or any other suitable system. An access device may generally be located in any suitable location, such as at the location of a merchant. An access device may be in any suitable form. Some examples of access devices include POS or point of sale devices (e.g., POS terminals), cellular phones, PDAs, personal computers (PCs), tablet PCs, handheld specialized readers, set-top boxes, electronic cash registers (ECRs), automated teller machines (ATMs), virtual cash registers (VCRs), kiosks, security systems, access systems, and the like. An access device may use any suitable contact or contactless mode of operation to send or receive data from, or associated with, a user mobile device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a payment device and/or mobile device. In some embodiments, a cellular phone, tablet, or other dedicated wireless device used as a POS terminal may be referred to as a mobile point of sale or an "mPOS" terminal.

An "authorization request message" may be an electronic message that requests authorization for a transaction. In some embodiments, it is sent to a transaction processing computer and/or an issuer of a payment card to request authorization for a transaction. An authorization request message according to some embodiments may comply with ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "transaction data" including, by way of example only: a service code, a CVV (card verification value), a dCVV (dynamic card verification value), a PAN (primary account number or "account number"), a payment token, a user name, an expiration date, etc. The authorization request message may include additional "transaction data," such as any information associated with a current transaction, such as the transaction amount, merchant identifier, merchant location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request. In some cases, it may be an electronic message reply to an authorization request message generated by an issuing financial institution or a transaction processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the merchant's access device (e.g. POS equipment) that indicates approval of the transaction. The code may serve as proof of authorization. As noted above, in some embodiments, a transaction processing computer may generate or forward the authorization response message to the merchant.

FIG. 1 shows a block diagram of a system 100 for performing a secure federated task (e.g., a project), according to some embodiments. In some embodiments, the federated task may include generating (also referred to as "training") a machine-learning model utilizing any suitable machine-learning algorithm, although the federated task may include any suitable processing. The system 100 may include a secure platform computer 102, computing device 104, and computing device 106. The system 100 may, in some embodiments, include any suitable number of computing devices corresponding to any suitable number of clients. Client A and Client B are utilized for illustration only and is not intended to limit the number of clients that may interact with the secure platform computer 102 for a given federated task.

The secure platform computer 102 may include any suitable number of modules to perform the functionality described herein. As depicted, the secure platform computer 102 includes key management module 107, project management module 108, data management module 110, model management module 112, notification module 114, model input module 116, and attestation module 118. In some embodiments, the secure platform computer 102 may manage a secure memory space such as enclave 120. The secure platform computer 102 may be configured to store cryptographic keys, project data, and models in corresponding data stores 122, 124, and 126, respectively. Data stores 122, 124, 126 may represent separate data stores, or such data may be stored in a combined data store.

The secure platform computer 102 may operate a number of protected modules within the enclave 120 such as key manager 128, project management module 130, data processing module 132, model generator 134, and model processing module 136, although the functionality of each may be combined in any suitable manner. The modules and data stores within enclave 120 may be protected (e.g., encrypted) such that only a chip set of the secure platform computer 102 may access those modules and/or data stores. Enclave 120 may be an example of a secure memory space.

The secure platform computer 102 may expose any suitable number of user interfaces (UIs) and/or application programming interfaces (APIs) for triggering the functionality of the modules provided within the enclave 120. By way of example, client onboarding UI/API 140 may include a UI and/or an API for providing data to the key management module 107. In some embodiments, each client device (e.g., the computing device 104, the computing device 106) may be configured to generate a public/private key pair (e.g., keys 150 and 152, respectively) and provide their public key via the client onboarding UI/API 140 to key management module 107. Likewise, the secure platform computer 102 may also be configured to generate a public/private key pair. In some embodiments, the communication between each computing device (e.g., the computing device 104) and the secure platform computer 102 may be secured via a transport layer security (TLS) protocol. Utilizing a TLS protocol may provide privacy and data integrity between the computing device 104 (or computing device 106) and the secure platform computer 102. Using the TLS protocol, the data transferred via the client onboarding UI/API 140 (e.g., a public key of the computing device) may be secure because the TLS connection between the computing device and the secure platform computer 102 is made private using symmetric cryptography (e.g., a shared secret known by the computing device and the secure platform computer 102 and negotiated for when the connection was established) to encrypt the transmitted data.

An encrypted version of the public key of the computing device 104 (e.g., a first public key) may be received by the key management module 107. The key management module 107 may decrypt the public key and transmit the public key to the key manager 128 or the key management module may transmit the encrypted public key and the shared secret to the key manager 128 for decryption. One the key manager 128 has obtained a decrypted version of the public key, the key manager 128 may assign the computing device 104 a client identifier (e.g., an alphanumeric identifier) and store the decrypted key in the data store 122 as being associated with client identifier. The key manager 128 and/or the key management module 107 may be configured to provide feedback (e.g., via the notification module 114) that the key provided was successfully and/or unsuccessfully registered with (e.g., stored by) the key manager 128. A similar process may be utilize by any suitable entity (e.g., client B) in order to provide the entity's public key (e.g., a second public key corresponding to client B) to the key management module 107 to eventually be decrypted and stored in the data store 122. In some embodiments, the public key of the secure platform computer 102 may be provided to the computing devices 104 and 106 (or any suitable device associated with a participant/entity of the project) by the secure platform computer 102 via corresponding secure connections and stored at the computing devices 104 and 106 for subsequent use. The public key of the secure platform computer 102 may be received via the client API 154 and 156, respectively.

In some embodiments, client A may utilize computing device 104 to begin defining a project. A project may include a joint task. As a non-limiting example, client A and client B may wish to jointly train a machine-learning model using a combination of data known to each client. Either client A or B (e.g., client A) may utilize their respective computing device to access the project setup UI/API 142 to provide at least a portion of project data to the project management module 108. For example, client A can provide a first portion of the project data (e.g., project data corresponding to client A) and client B can provide a second portion of project data (e.g., project data corresponding to client B). Client A may be an example of a first entity and client B may be an example of a second entity. In some embodiments, any data provided via the project setup UI/API 142 may be digitally signed using the private key of the data provider (e.g., client A's private key for client A's data, client B's private key for client B's data, etc.). In some embodiments, the digital signature may be generated and utilized as a JSON Web Signature. A JSON Web Signature is an IEFT-proposed standard for signing arbitrary data. In some embodiments, project data may include a project identifier (e.g., defined by the client), a client identifier for the providing entity (e.g., an identifier for client A), one or more client identifiers for other entities that are to participate in the project (e.g., an identifier for client B), one or more schemas (also referred to as "data dictionaries"), one or more transformation rules for converting data provided in one format to another format, a data usage policy (e.g., one or more rules for allowing/restricting use of the client's data), one or more selected machine-learning algorithms, a performance target (e.g., a threshold value indicating 90% accuracy), or any suitable data that may be utilized to define/describe the providing entity's data, the project, or how the providing entity's data is to be used and/or formatted to be utilized for the project. In some embodiments, the project data may include an expiration date after which the client's data may no longer be utilized for the project. Upon expiration, the client's data may be deleted from the system.

As a non-limiting example, client A (e.g., a first entity) may provide a first portion of the project data including a client identifier for client A, a client identifier for client B indicating that client B is expected to participate in the project, one or more schemas corresponding to client A's data, one or more transformation rules utilized by client A, a data usage policy indicating that client A's data is not to be utilized for a particular machine-learning algorithm (e.g., a clustering algorithm), a selected machine-learning algorithm (e.g., a particular classification algorithm), and a performance target of 90%.

In some embodiments, the project management module 108 may receive a portion of the project data from each entity (e.g., the project data from client A, referred to as a first portion) and may provide the project data (and/or each portion of the project data) to the project management module 130. The project management module 130 may be configured to verify the source of the project data and the integrity of the data by verifying the digital signature was provided by the providing entity (e.g., client A) utilizing the public key stored in the data store 122 and associated with the providing entity. If the digital signature is verified (e.g., the project data is determined to be unmodified and to have actually been sent by the providing entity), the project management module 130 may be configured to store the project data in the data store 124 for subsequent use. If a project identifier was not provided by the client, the project management module 130 may generate a project identifier for the project. Any subsequent data exchanges between the secure platform computer 102 and the computing devices 104 and 106 may include the project identifier for the project. In some embodiments, the project management module 130 may be configured to generate one or more usage policies for allowing or restricting the use of the providing entity's data. In some embodiments, a usage policy may include one or more rules that allow or restrict the use of data provided by an entity. In some embodiments, the one or more usage policies may be provided as part of the project data received from the providing entity. The one or more usage policies may also be stored in data store 124 for subsequent use.

In some embodiments, when the project data indicates one or more additional entities that are to participate in the project, the project management module 108 may be configured to cause notification module 114 to provide one or more notifications to each of the additional entities. Any notification provided by the secure platform computer 102 may be received by a computing device (e.g., computing device 106) via a client API (e.g., client API 156). In some embodiments, the notification may include any suitable combination of the project data previously provided by an entity (e.g., client A). As a non-limiting example, if client A was to initiate a project and indicate that client B is to participate in the project (e.g., by including contact information such as an email address, a mobile phone number, etc. of client B), the notification module 114 may be configured to cause a notification to be sent to client B (e.g., via client API 156, via email, text message, etc. using the contact information for client B as provided by client A) indicating that additional project data is requested from client B for that project. The notification may present any or all project data provided by client A. In some embodiments, the project data may include a project identifier.

Client B (and any other additional entities) may utilize the project setup UI/API 142 in a similar manner as discussed above in order to provide additional project data (e.g., a second portion of the project data corresponding to client B). For example, client B may provide its own project data including, but not limited to, one or more schemas/data dictionaries, one or more transformation rules for converting data provided by the client B to another format, a data usage policy (e.g., one or more rules for using the client B's data), one or more selected machine-learning algorithms, a performance target (e.g., a threshold value indicating 90% accuracy), or any suitable data that may be utilized to identify/define client B's data, the task, or how client B's data is to be used and/or formatted to be utilized for performing the task. Client B may similarly define an expiration date after which their data will be deleted from the system.

In some embodiments, the project data may be transmitted with the project identifier and a client identifier of client B indicating that this portion of project data is provided by and associated with client B. The project data provided by client B may be digitally signed (e.g., with client B's private key). The project management module 108 may receive the project data and digital signature from the project setup UI/API 142 and provide client B's project data and digital signature to the project management module 130. The project management module 108 may verify the source of the data and the integrity of the data by verifying the digital signature utilizing the public key stored in data store 122 and associated with client B. If the digital signature is verified (e.g., the project data is determined to be unmodified and to have been actually sent by client B), the project management module 130 may be configured to store the project data in the data store 124 for subsequent use. In some embodiments, the project management module 130 may be configured to generate one or more usage policies for allowing or restricting the use of client B's data. In some embodiments, the one or more usage policies may be provided in the project data. The one or more usage policies may also be stored in data store 124 for subsequent use.

It should be appreciated that any suitable number of entities participating in the project may be notified if any discrepancies exist in the project data and/or the entities may be notified of the other entities' intent to utilize the data in a particular manner. By way of example, client A may select a particular machine-learning algorithm and client B may select the same and/or a different machine-learning algorithm, the project management module 130 may cause notifications to be provided by the notification module 114 to client A and B informing them of the others' intended use of the data (e.g., the other entity's defined task). In some embodiments, the entity receiving such a notification may be provided an option to allow the project to go forward as defined or to restrict the other entity from using the secure platform computer 102 to perform the defined task. For example, client A may allow or deny usage of its data to be utilized for training a machine-learning model using the algorithm(s) indicated by client B. These option selections may be received and processed by the notification module 114. If a denial is received, the notification module 114 may trigger the project management module 108 to request that client B modify the project data in a particular way (e.g., to select a different machine-learning model). Once all of the entities of the project have provided data and no unresolved discrepancies exist, the project management module 130 may cause the notification module 114 to provide notification to the participating entities that the project has been defined and/or that the participants may upload their respective data sets. Thus, each client participating in the project can be notified of the intended task(s) and data use(s) of the other participants in the project and explicitly grant or deny the use of their data for such purposes.

In some embodiments, clients A and B may utilize the data upload UI/API 144 to provide their respective data sets. In some embodiments, the computing devices 104 and 106 may be configured with client data encryption modules 158 and 160, respectively. Client data encryption modules 158 and 160 may be utilized to transmit a respective client's data set such that the data set is encrypted and digitally signed. By way of example, the data set may be encrypted utilizing the public key of the secure platform computer 102 (ensuring that only an entity, in this case the secure platform computer 102, with the corresponding private key could decrypt the data). In some embodiments, the project data set may be encrypted utilizing JSON Web Encryption. JSON Web Encryption is an IETF standard providing a standardized syntax for the exchange of encrypted data based on JSON and Base64. The client's data may also be digitally signed using the client's private key.

The data management module 110 may be configured to receive the encrypted and digitally signed data set and transmit that data set to the data processing module 132. The data management module 110 may not obtain a decrypted version of the received data set. The data processing module 132 may be configured to decrypt the data set utilizing the private key of the secure platform computer 102 and to verify the source of the data set and integrity of the data set using the public key of the purported sender. Said another way, the data processing module 132 may utilize the public key of the purported sender and the digital signature to ensure that the data set has not been modified and that the data set was actually provided by the purported sender. If the digital signature is verified (e.g., the data set is determined to be unmodified and actually provided by the purported sender), the data processing module 132 may be configured to assign the data set a data set identifier and store the decrypted data set in the data store 124. The data processing module 132 may be configured to access any suitable project data associated with the data provider (e.g., client A) from the data store 124. Once accessed, the data processing module 132 may utilize any suitable schema to validate the format and/or values of the data provided. The data processing module 132 may further utilize any suitable transformation data to convert the data from any suitable first format to any suitable second format. If validation and/or transformation fails, the data processing module 132 may be configured to cause the notification module 114 to notify the providing client of the error. Once validated and/or converted, the data processing module 132 may be configured to store the data in the data store 124. In some embodiments, the data processing module 132 may store an entity's data set (e.g., the first data set provided by client A) separate from a second entity's data set (e.g., the second data set provided by client B). Each data set (e.g., the first data set) may be inaccessible to the other participant(s) of the project (e.g., client B). Thus, each entity's data set may be inaccessible to any of the other entities of the project.

In some embodiments, the data processing module 132 may store the encrypted data set received from the client in an immutable ledger 127 (an example of a blockchain). A blockchain may include a growing list of records, called blocks, that are linked using cryptography. Each block may contain a cryptographic hash of the previous block, a timestamp, and transaction data (generally represented as a Merkle tree). By design, a blockchain may be resistant to modification of the data. Once recorded, the data in any given block cannot be altered retroactively without alteration of all subsequent blocks. Although not technically unalterable, blockchains may be considered secure by design and may be referred to as an immutable ledger. Every data set received by the secure platform computer 102 may be stored in the immutable ledger 127. In some embodiments, the data set (or keys of the data set) may be hashed and included in the immutable ledger 127 along with any suitable portion of the project data as well as the client identifier of the entity that provided the data set. In some embodiments, a new record (e.g., a block) may be added to the immutable ledger 127 including a hash of the previous record (block), the hash of the data set, and the project data and client identifier of the entity that provided the data set. In some embodiments, the data processing module 132 may provide the hash of the previous block to the entity that provided the data set as proof that the data set was successfully stored.

Either the client A or client B may utilize their respective computing device to access the model management UI/API 146. The model management UI/API 146 may be configured to enable either client (e.g., a first entity, a second entity, etc.) to trigger a model generation process. During the model generation process, a machine-learning model may be generated based at least in part on the first data set (e.g., provided by a first entity such as client A) and a second data set (e.g., provided by a second entity such as client B). In some embodiments, the particular model(s) generated may be in accordance with previously provided project data. The model management UI/API 146 may provide a selectable option that, when selected, transmits a task request for model generation. The task request may be received from the model management UI/API 146 by the model management module 112. In some embodiments, the task request may include a project identifier, a client identifier, a digital signature of the requesting entity (e.g., a digital signature generated using the requesting entity's private key), one or more request codes (each indicating an action being requested such as training a model using a particular machine-learning algorithm), and the like. The task request may be transmitted by the model management module 112 to the model generator 134. The model generator 134 may be configured to validate the source of the request and that the request is unmodified by verifying the digital signature using the public key of the requesting entity as retrieved from data store 122. If the digital signature is not verified (e.g., the message was modified or was not provided by the purported sender), the task request may be denied and the notification module 114 may be stimulated to provide a notification of the denial to the requesting entity.

When the digital signature is verified, the model generator 134 may access project data associated with the project identifier. In some embodiments, the model generator 134 may verify that the requesting entity is associated with the project (e.g., is the same as the first entity or the second entity) before proceeding. If the requesting entity is not associated with the project, the task request may be denied and the notification module 114 may be stimulated to provide a notification of the denial to the requesting entity. If the task request is valid and the requesting entity is associated with the project, the model generator 134 may be configured to perform the one or more tasks as defined by the project data. Thus, in some embodiments, the task request is merely a request to perform the task(s) as defined by the project data. By way of example, the requesting entity (e.g., client A) may have previously indicated that data sets provided by client A and client B are to be utilized to generate (e.g., train) a machine-learning model utilizing a particular machine-learning algorithm (or type of machine-learning algorithm). Accordingly, the model generator 134 may be configured to execute a training process that generates a machine-learning model utilizing the data sets previously provided by the respective clients (e.g., the first data set provided by client A and the second data set provided by client B, collectively referred to as "training data") and the machine-learning algorithm specified in the project data. It should be appreciated that the project data may specify more than one machine-learning model to be generated (e.g., utilizing the same or a different machine-learning algorithm). Thus, in some embodiments, the model generator 134 may be configured to generate/train more than one machine-learning model. In some embodiments, the model generator 134 may be configured to cause the notification module 114 to provide a notification to the entities associated with the project, that one or more models have been generated in accordance with the project data. In some embodiments, the notification may include the project identifier and the model identifier.

Once generated (trained), the model(s) may be associated with a model identifier (e.g., generated by the model generator 134) and stored in data store 126 (e.g., by the model generator 134) for subsequent use. The data store 126 may be configured to store any suitable number of machine-learning models generated and/or associated with any suitable number of projects. Each model may be associated with a model identifier and/or a project identifier corresponding to the project to which the model relates. In some embodiments, any suitable number of additional machine-learning models may be generated.

At any suitable time after the model(s) have been generated, the client A (the first entity) or client B (the second entity) or any suitable participant/entity of the project may utilize model input UI/API 148 to submit an output request (e.g., a request for output from one or more models generated for the project). The output request may include input data in any suitable form. In some embodiments, the input data may be encrypted using the public key of the secure platform computer 102. The input data may also include a digital signature generated using the private key of the providing entity in a similar manner as described above. The model input module 116 may be configured to receive the encrypted data along with the corresponding digital signature and to provide the encrypted data and digital signature to the model processing module 136. Model processing module 136 may be configured to validate the input data and the source of the input data utilizing the private key associated with the requesting party and the digital signature. If the request is valid (e.g., unmodified and actually sent by the requesting party) and the requesting party is associated with a project the model processing module 136 may utilize the corresponding project data to validate the data and/or to convert the data to another format. In some embodiments, the model processing module 136 may provide feedback to the model input module 116 that indicates that client B is to provide additional input data for the request.

In some embodiments, the model input module 116 may transmit any suitable data to the computing device 106 requesting additional data from client B. Generally, the model input module 116 may be configured to request any suitable data from any suitable computing device. In some embodiments, a request provided by the model input module 116 may be received by the client APIs 154 and 156 respectively utilized by the computing devices 104 and 106. Client B may provide its data in a similar manner as described above to the model input module 116 and the data may be verified and decrypted by the model processing module 136.

The input data (e.g., new data for the model(s) as provided by client A and in some cases, together with the data provided by client B) may be utilized as input data to the machine-learning model by the model processing module 136. The model's output data may be provided to any client who submitted input data or at least the client that initiated the output request (e.g., in the ongoing example, client A). It may be the case, that client A and client B utilize different models, thus, in some embodiments, although both client may at times provide input data, the output data may be provided only to the client that requested the particular model (e.g., as indicated in the project data). The specific format and type of output data provided by the model(s) may vary based at least in part on the context in which the model(s) are trained and the specific training data utilized.

In some embodiments, the input data may be forwarded to the model management module 112 to be utilized to update and/or retrain the machine-learning model. The model management module 112 may forward the encrypted and digitally signed data to the model generator 134 which may be configured to validate the source and integrity of the input data and that the source is allowed to provide new training data (e.g., the source is associated with the project). If valid, the input data can be added to the training data set (e.g., a data set comprising the first data set provided by client A and the second data set provided by client B).

In some embodiments, the input data (as encrypted) may be added to the immutable ledger 127 (e.g., by the model generator 134 or the model processing module 136). In some embodiments, the input data (or keys of the input data) may be hashed and included in a new record (block) of the immutable ledger 127 along with any suitable portion of the project data as well as the client identifier of the entity that provided the input data. A hash of the previous record (block) may also being included in the current block. The output data may likewise be encrypted (e.g., using the public key of the secure platform computer 102) and added to the immutable ledger 127 by the model processing module 136 in yet another new record (block). In some embodiments, the output data (or keys of the output data) may be hashed and included in a new record (block) of the immutable ledger 127 along with any suitable portion of the project data as well as the client identifier of the entity that requested the output data. The model processing module 136 (or model generator 134) may additionally generate a hash of the previous record (block) of the immutable ledger 127 and include this hash in the current record (block). Thus, the immutable ledger 127 may contain encrypted and hashed versions of all input data received and all output data transmitted by the secure platform computer 102.

At any suitable time, a participant of the project may access attestation UI/API 160 to request attestation of the secure platform computer 102. The attestation module 118 may receive a task request indicating attestation is requested (e.g., requesting the immutable ledger 127, requesting verification of the immutable ledger 127, etc.) and may forward the task request to the data processing module 132 for processing. In some embodiments, the data processing module 132 may be configured to validate the records (blocks) of the immutable ledger 127 by verifying the hashes of each block represent the hashes of the previous record (block). The data processing module 132 may provide a response to the task request indicating the immutable ledger 127 was verified or not. The response may include the hash of the most recent block. The response may be in any suitable format. In some embodiments, the data processing module 132 may generate a digital signature utilizing the private key associated with the secure platform computer 102 to certify that the immutable ledger 127 has been verified. The computing device may be configured to verify the digital signature. If the digital signature is verified (e.g., indicating the data has not been altered and the secure platform computer 102 sent the digital signature), the computing device can consider the immutable ledger 127 verified.

In some embodiments, a participating entity may access the model management UI/API 146 to initiate a task request indicating a request to update and/or retrain the machine-learning model. The task request may include a digital signature generated using the private key of the requesting device. The model management module 112 may receive the task request and forward the request and the digitally signature to the model generator 134 which may be configured to validate the source and integrity of the request and that the source is allowed to request such a task (e.g., update and/or retraining of a particular machine-learning model). If the digital signature is valid and the source is allowed to make such a request, the model generator 134 may be configured to update and/or retrain the machine-learning model using any suitable training data (e.g., data sets initially provided and any input data/output data subsequent obtained) stored in the data store 124.

Figure 2:
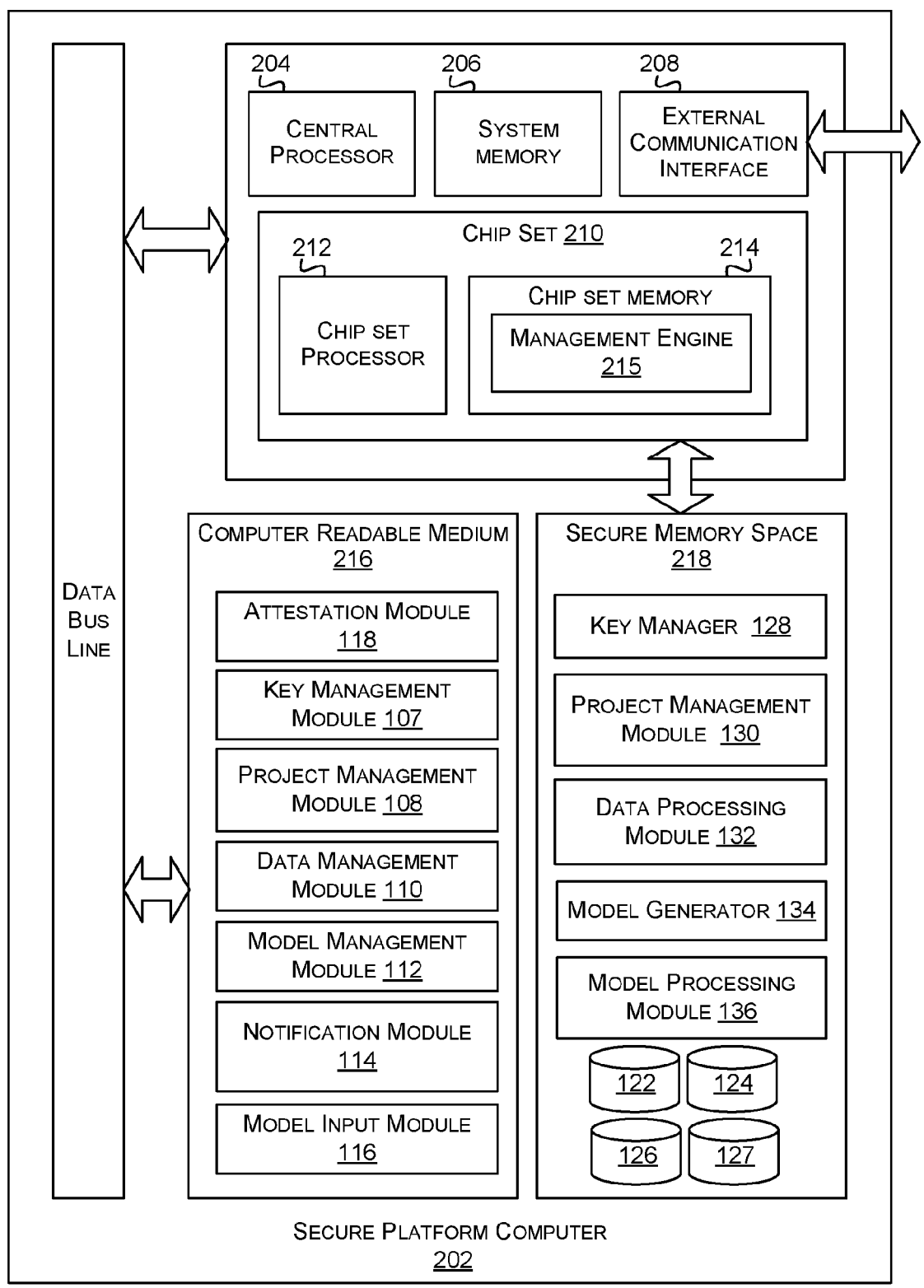
FIG. 2 shows a block diagram of an exemplary secure platform computer, according to some embodiments.

FIG. 2 shows a block diagram of an exemplary secure platform computer 202 (e.g., an example of secure platform computer 102 of FIG. 1), according to some embodiments. The secure platform computer 202 may include a central processor 204. The processor 204 may be coupled to a system memory 206 and an external communication interface 208. The secure platform computer 202 may include chip set 210. The chip set 210 may include a chip set processor 212 that may be coupled with chip set memory 214. The chip set memory 214 may be configured to store chip set instructions (e.g., firmware or configuration logic) for performing functionality described herein with respect to chip set operations.

Chip set memory 214 may include instructions for management engine 215. Management engine 215 may comprise code, executable by the chip set processor 212, for initializing and managing one or more secure memory spaces, such as secure memory space 218 (e.g., an example of enclave 120 of FIG. 1). The management engine 215 may be configured to enforce access control protocols to restrict access to the secure memory space 218. Utilizing the access control protocols, the management engine 215 may restrict access to the secure memory space 218 such that only applications, modules, and/or processes executing within the secure memory space 218 may access content (e.g., the data stores 122, 124, and 126 of FIG. 1) within the secure memory space 218.

A computer readable medium 216 may also be operatively coupled to the processor 204. The computer readable medium 216 may comprise software that is executable by the processor 204. For example, key management module 107, project management module 108, data management module 110, model management module 112, notification module 114, model input module 116, and attestation module 118 may each be executed by the processor 204. It should be appreciated that none of the modules 106-118 may have access to data stores 122, 124, and 126 in accordance with the restrictions provided by the management engine 215.

The secure memory space 218 may be operatively coupled to the chip set processor 212, and the secure memory space 218 may include the key manager 128, the project management module 130, the data processing module 132, the model generator 134, and the model processing module 136. Management engine 215 may allow modules 128-136 to access any of the data of data stores 122, 124, and/or 126. Modules 128-136 may comprise code, executable by the chip set processor 212, for performing the functionality described above in connection with FIG. 1.

The data stores 122, 124, and 126 may be implemented using various data structures, such as an array, hash map, (linked) list, structured text file (e.g., XML), table, and/or the like. Such data structures may be stored in memory and/or in structured files. The data stores 122-126 may be configured to reside within the secure memory space 218 by the management engine 215. Access to the data store 122-126 may be performed according to access control protocols associated with the management engine 215. In some embodiments, the data stores 122-126 may be configured to store encrypted data. By way of example, the data stores 122-126 may be configured to store cryptographic keys, project data, training data, and/or models in encrypted form as encrypted by the secure platform computer 202. The management engine 215 may enforce access control to the data stores 122-126 such that content of these data stores is accessible by the chip set processor 212 via execution of function calls of the modules 128-136, and inaccessible by any other means.

The management engine 215 can create and manage secure memory spaces. As processor 204 initially loads code and data of the modules 128-136, the processor 204 may transmit a secure memory space request to the chip set processor 212. Upon receipt, the chip set processor 212 can execute instructions of the management engine 215 to initialize and configure the secure memory space 218.

In some embodiments, the management engine 215 may cause the chip set processor 212 to copy code and data of the modules 128-136 from unprotected memory (e.g., the computer readable medium 216) into the secure memory space 218. The management engine 215 can then cause the processor 212 to encrypt (e.g., cryptographically hash) the contents of the secure memory space 218 using an encryption key stored in chip set memory 214. In some embodiments, the encryption key may be hard-coded into the chip set memory 214. The encryption ensures that the code and data stored in the secure memory space 218 cannot be accessed by other software, including system software, or other devices. In some embodiments, the management engine 215 can support multiple secure memory spaces at a time.

The key management module 107 may be configured to receive (e.g., from the client onboarding UI/API 140 of FIG. 1) key requests from a client device. In some embodiments, the key management module 107 may be configured to initiate a secure communications channel (e.g., a transport layer security (TLS) connection) with a remote device (e.g., computing device 104 of FIG. 1), where the channel is encrypted end-to-end using a share secret negotiated when initiating the connection. The secure communications channel may be utilized to exchange public keys between the secure platform computer 202 and a computing device (e.g., the computing device 104, the computing device 106, etc.). The public keys received by the key management module 107 may be provided to the key manager 128 at any suitable time. The key manager 128 may be configured to store the received key(s) in the data store 122 for subsequent use. The key management module 107 may be configured to generate a client identifier for the requesting device if a client identifier was not provided by the client device. The client identifier may be stored as an association with the received key in the data store 122 for later lookup.

The project management module 108 may be configured to receive (e.g., from the project setup UI/API 142 of FIG. 1) digitally signed project data (e.g., project data with a digital signature generated using the private key of a computing device) from one or more computing devices (e.g., devices associated with one or more clients/project participants). The project management module 108 may be configured to communicate with notification module 114, a component configured to provide a variety of notifications from the secure platform computer 202. For example, the project management module 108 may inspect the project data provided by one entity (e.g., client A) that indicates another entity (e.g., client B) is to be a participant in the project. Upon determining that the other entity (e.g., client B) has not yet provided data, the project management module 108 may be configured to execute code to cause the notification module 114 to transmit a notification to a computing device associated with the entity (e.g., computing device 106) requesting additional project data.

The project management module 108 may be configured to transmit any received project data to the project management module 130. The project management module 130 may be configured to verify the data. By way of example, the project management module 130 may be configured to cause the chip set processor 212 to retrieve the public key associated with the project data provider (e.g., utilizing a client identifier received as part of the project data identifying the provider of the project data) to verify the digital signature. If the digital signature is verified, the project data may be trusted to be unmodified and to have actually been sent by the purported sender. The project management module 130 may be configured to cause the chip set processor 212 to store any suitable project data (e.g., verified project data) in the data store 124 for subsequent use. In some embodiments, the project data may include a project identifier and any suitable number of client identifiers with which the project data may be retrievable. In some embodiments, the project management module 130 may be configured to generate any suitable number of usage policies (e.g., one or more rules) that define how project data (e.g., training data stored in data store 124) can be utilized and by whom.

The data management module 110 may be configured to receive (e.g., from the data upload UI/API 144 of FIG. 1) encrypted and digitally signed data (e.g., training data encrypted using a public key of the secure platform computer 202 and including a digital signature generated using the private key of a providing entity) from one or more computing devices (e.g., devices associated with one or more clients/project participants).

The data management module 110 may be configured to transmit any suitable encrypted data to the data processing module 132. The data processing module 132 may be configured to decrypt and verify the data. By way of example, the data processing module 132 may be configured to cause the chip set processor 212 to decrypt the data utilizing the public key associated with the secure platform computer 202. In some embodiments, the data processing module 132 may be configured to cause the chip set processor 212 to retrieve the public key associated with the project data provider to verify the digital signature. If the digital signature is verified, the data may be trusted to be unmodified and to have actually been sent by the purported sender. The data processing module 132 may be configured to cause the chip set processor 212 to store any suitable data (e.g., training data) in the data store 124 for subsequent use. In some embodiments, the data processing module 132 may be configured to cause chip set processor 212 to validate the data and/or convert the data according to any suitable previously provided project data. By way of example, the data processing module 132 may utilize a previously-provided schema to validate the format and/or values of the data provided. As another example, the data processing module 132 may utilize previously-provided transformation data to convert the data provided from a first format to a second format.

In some embodiments, the data processing module 132 may be configured to store the encrypted data received from the client in the immutable ledger 127 (an example of a blockchain). Every data set received by the data processing module 132 may be stored in the immutable ledger 127. In some embodiments, the data set (or keys of the data set) may be hashed and included in the immutable ledger 127 along with any suitable portion of the project data as well as the client identifier of the entity that provided the data set. In some embodiments, a new record (e.g., a block) may be added to the immutable ledger 127 including a hash of the previous record (block), the hash of the data set, and the project data and client identifier of the entity that provided the data set. In some embodiments, the data processing module 132 may provide the hash of the previous block to the entity that provided the data set as proof that the data set was successfully stored.

The model management module 112 may be configured to receive (e.g., from the model management UI/API 146 of FIG. 1) a model request including a digital signature generated using the private key of the requesting entity (e.g., a device associated with a client/project participant). The request may include a client identifier of the requesting entity. In some embodiments, the request may include a project identifier associated with the project.

The model management module 112 may be configured to transmit the request to the model generator 134. The model generator 134 may be configured to verify the request. By way of example, the model generator 134 may be configured to cause the chip set processor 212 to retrieve the public key associated with the requesting entity (e.g., from the data store 122) to verify the digital signature. If the digital signature is verified, the request may be trusted to be unmodified and to have actually been sent by the purported sender. In response to verifying the digital signature, the model generator 134 may be configured to cause the chip set processor 212 to verify (e.g., utilizing a project identifier included in the request and previously stored project data and/or usage policies) that the requestor is allowed to initiate model generation. If the requestor is associated with previously stored project data, the model generator 134 may be configured to cause the chip set processor 212 to generate (e.g., train) a machine-learning model (or more than one machine-learning model) according to the algorithm(s) indicated in the previously-store project data.

The model input module 116 may be configured to receive (e.g., from the model input UI/API 148 of FIG. 1) an output request including input data and a digital signature generated using the private key of the requesting entity (e.g., a device associated with a client/project participant). The output request may be in any suitable form and may include a client identifier of the requesting entity and a project identifier for the project.

The model input module 116 may be configured to transmit the output request to the model processing module 136. The model processing module 136 may be configured to verify the output request. By way of example, the model processing module 136 may be configured to cause the chip set processor 212 to retrieve the public key associated with the requesting entity (e.g., from the data store 122) to verify the digital signature. If the digital signature is verified, the output request may be trusted to be unmodified and to have actually been sent by the purported sender. In response to verifying the digital signature, the model processing module 136 may be configured to cause the chip set processor 212 to provide the input data to the model (or models) associated with the project (e.g., the project associated with the project identifier of the output request). The output from the model may be encrypted using the public key of the requesting entity and provided via the model input module to the requesting input. In some embodiments, the output data may be provided via the client API (e.g., the client API 154 of FIG. 1). In some embodiments, the output data may be decrypted using the private key of the computing device corresponding to the public key used to encrypt the output data in the first place.

In some embodiments, the input data (as encrypted in the output request) may be forwarded to the model generator 134 via the model management module 112. The model generator 134 may decrypt the input data and add the input data to the training data. The model generator 134 may utilize the updated training data to update and/or retrain one or more models at any suitable time. For example, the computing device 104 may be utilized to access the model management UI/API 146 to provide an update request. The update request may include a project identifier and a client identifier. The update request may be transmitted to the model generator 134 via the model management module 112. The model generator 134 may update one or more models associated with the project identifier utilizing the training data including the input data recently provided.

In some embodiments, the input data (as encrypted) may be added to the immutable ledger 127 (e.g., by the model generator 134 or the model processing module 136). In some embodiments, the input data (or keys of the input data) may be hashed and included in a new record (block) of the immutable ledger 127 along with any suitable portion of the project data as well as the client identifier of the entity that provided the input data. A hash of the previous record (block) may also being included in the current block. The output data may likewise be encrypted (e.g., using the public key of the secure platform computer 102) and added to the immutable ledger 127 by the model processing module 136 in yet another new record (block). In some embodiments, the output data (or keys of the output data) may be hashed and included in a new record (block) of the immutable ledger 127 along with any suitable portion of the project data as well as the client identifier of the entity that requested the output data. The model processing module 136 (or model generator 134) may additionally generate a hash of the previous record (block) of the immutable ledger 127 and include this hash in the current record (block). Thus, the immutable ledger 127 may contain encrypted and hashed versions of all input data received and all output data transmitted by the secure platform computer 102.

At any suitable time, a participant of the project may request attestation of the secure platform computer 102 (e.g., utilizing the attestation UI/API 160 of FIG. 1). The attestation module 118 may receive a task request indicating attestation is requested and may forward the task request to the data processing module 132 for processing. In some embodiments, the data processing module 132 may be configured to validate the records (blocks) of the immutable ledger 127 by verifying the hashes of each block represent the hashes of the previous record (block). The data processing module 132 may provide a response to the task request indicating the immutable ledger 127 was verified or not. The response may include the hash of the most recent block. In some embodiments, the data processing module 132 may generate a digital signature utilizing the private key associated with the secure platform computer 102 to certify that the immutable ledger 127 has been verified. The computing device may be configured to verify the digital signature. If the digital signature is verified (e.g., indicating the data has not been altered and the secure platform computer 102 sent the digital signature), the computing device can consider the immutable ledger 127 verified.

Figure 3:
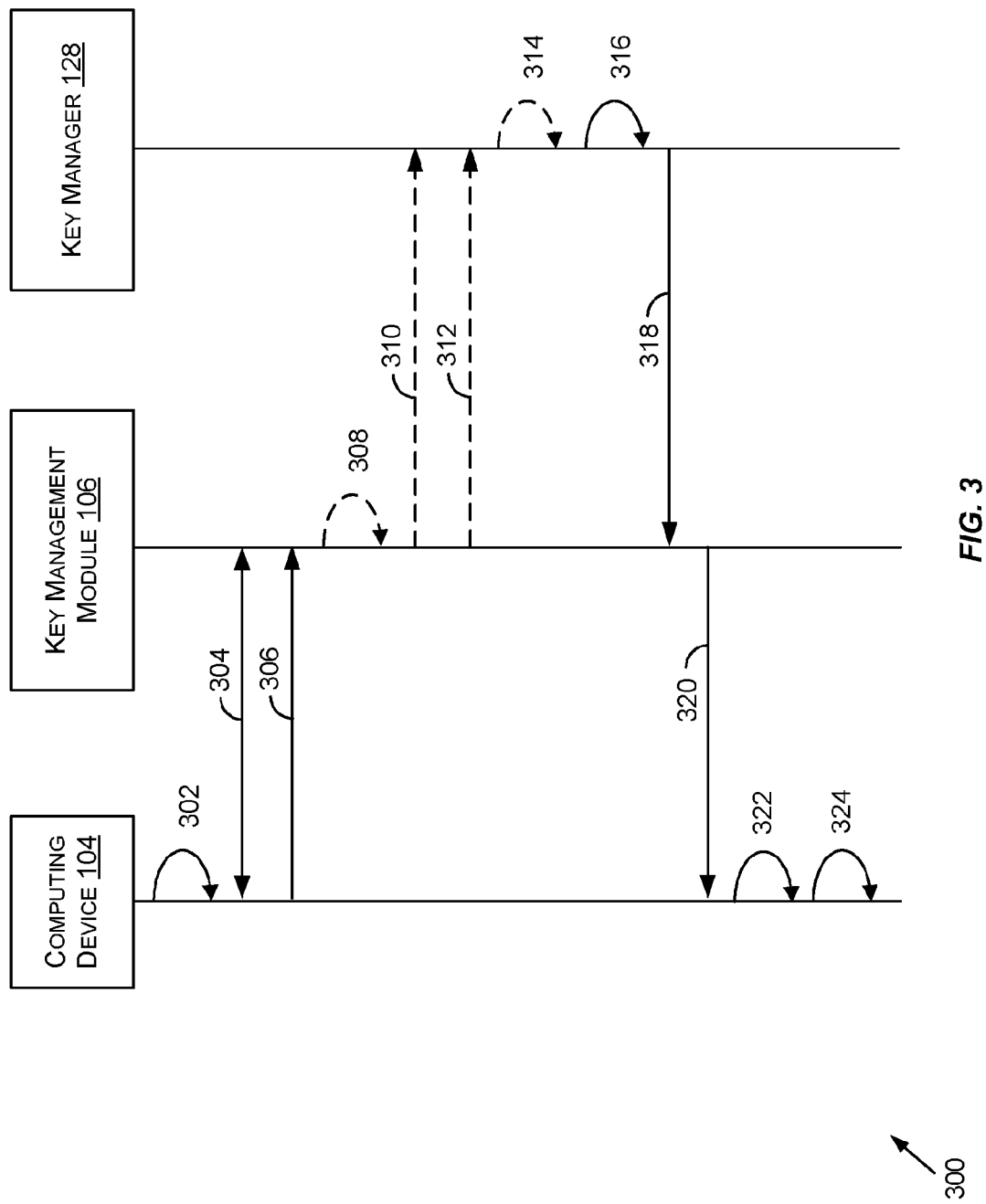
FIG. 3 shows a flow diagram illustrating a method for securely exchanging keys, according to some embodiments.

FIG. 3 shows a flow diagram illustrating a method 300 for securely exchanging keys (e.g., public keys), according to some embodiments. Method 300 may be performed with computing device 104 and/or computing device 106, key management module 107, and key manager 128. Key management module 107 may execute in an unsecure memory space (e.g., computer readable medium 216 of FIG. 2) of a secure platform computer (e.g., the secure platform computer 202 of FIG. 2). The key manager 128 may execute within a secure memory space such as the secure memory space 218 of FIG. 2 (e.g., an example of the enclave 120 of FIG. 1).

The method 300 may begin at 302, where a UI and/or API (e.g., the client onboarding UI/API 140) may be accessed via the computing device 104 to request a key exchange.

At 304, a secure connection can be established between the key management module 107 and the computing device 104. The secure connection can be a transport layer security (TLS) connection. A shared secret can be negotiated between the key management module 107 and the computing device 104 to establish the secure connection.

At 306, the computing device 104 may transmit its public key via the secure channel. That is, the public key of computing device 104 may be encrypted using the shared secret negotiated for the secure connection.

At 308, the key management module 107 may receive and decrypt the public key used the shared secret. Once decrypted, the public key of the computing device 104 may be forwarded to the key manager 128 at 310. Alternatively, the method may skip steps 308 and 310 and the key management module 107 may simply transmit the encrypted key and the shared secret to the key manager 128 at 312 and the key manager 128 may decrypt the encrypted key utilizing the shared secret at 314 in order to retrieve the public key of the computing device 104.

In either scenario, at 316, the key manager 128 may store the public key of computing device 104 in a data store configured to store such information (e.g., the data store 122 of FIGS. 1 and 2). In some embodiments, the public key may be stored with an association to a client identifier corresponding to the computing device 104.

At 318, the key manager 128 may return the public key associated with the secure platform computer on which the key manager 128 executes to the key management module 107. In some embodiments, this public key may be encrypted with the shared secret by the key manager 128 if the shared secret is known to the key manager 128. In some embodiments, the key management module 107, rather than the key manager 128, may encrypt the public key of the secure platform computer.

At 320, the public key of the secure platform computer (as encrypted using the shared secret negotiated at 304) may be transmitted to the computing device 104 via the secure connection established at 304.

At 322, the computing device 104 may receive and decrypt the public key used the shared secret. Once decrypted, the public key of the computing device 104 may store the decrypted public key in local memory at 324 for subsequent use.

The method 300 may be performed any suitable number of times with may any suitable number of computing devices in order to exchange public keys between the secure platform computer and the respective computing devices.

Figure 4:
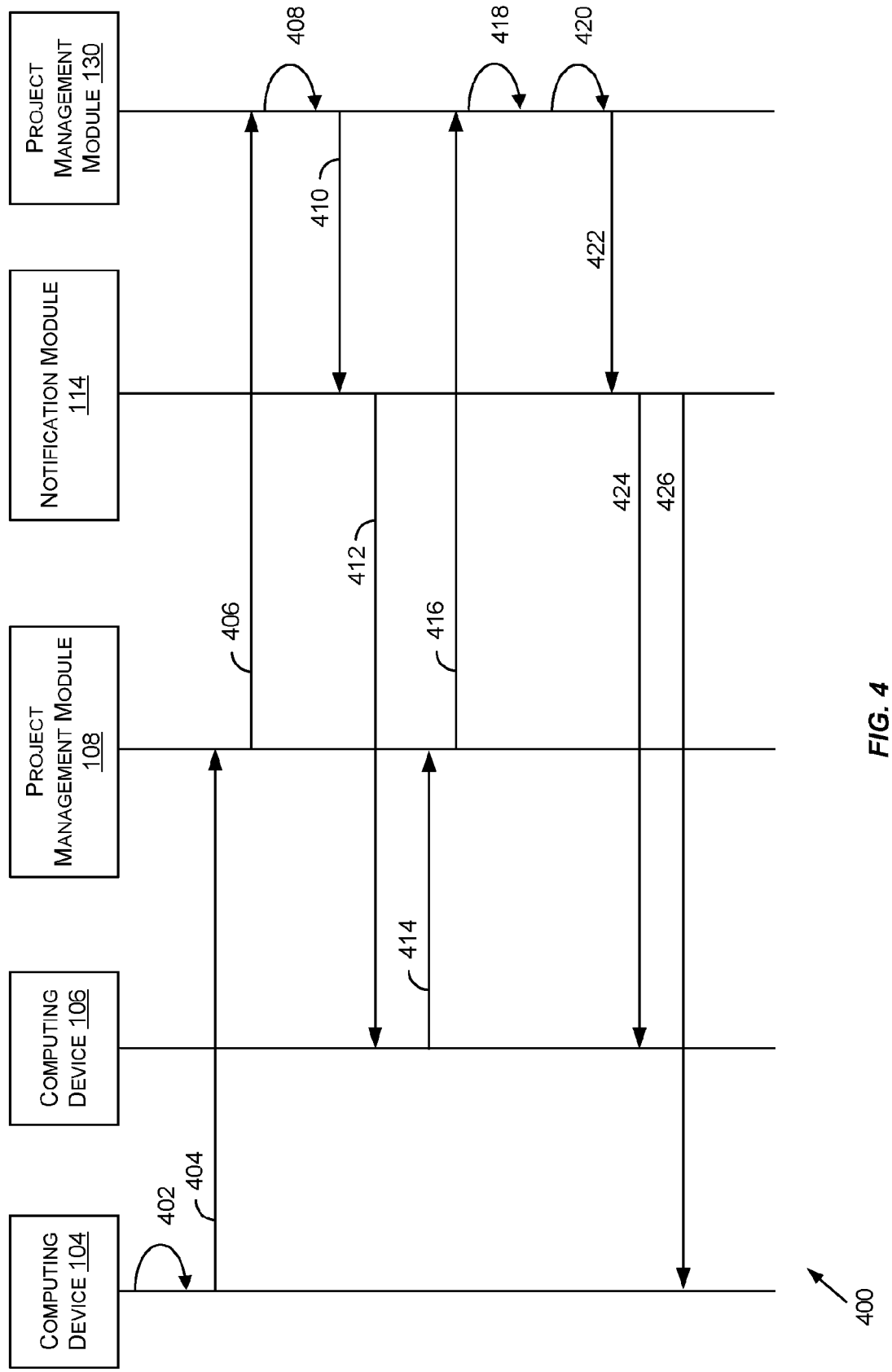
FIG. 4 shows a flow diagram illustrating a method for securely defining a project, according to some embodiments.

FIG. 4 shows a flow diagram illustrating a method 400 for securely defining a project, according to some embodiments. Method 400 may be performed with any suitable number of computing devices (e.g., computing device 104 and/or computing device 106 of FIG. 1), project management module 108 of FIGS. 1 and 2, notification module 114 of FIGS. 1 and 2, and project management module 130 of FIGS. 1 and 2. Project management module 108 may execute in an unsecure memory space (e.g., computer readable medium 216 of FIG. 2) of a secure platform computer (e.g., the secure platform computer 202 of FIG. 2). The project management module 130 may execute within a secure memory space such as the secure memory space 218 of FIG. 2 (e.g., an example of the enclave 120 of FIG. 1).

The method 400 may begin at 402, where a UI and/or API (e.g., the project setup UI/API 142) may be accessed via the computing device 104 to initiate a project. At 402, the computing device 104 may be utilized to obtain any suitable project data defining a project between any suitable number of project participants. Although the example provided in FIG. 4 utilizes two project participants, it should be appreciated that more participants may be include in other projects. The project data obtained at 402 may include include permissive use information defining a task for the project (e.g., training and/or maintaining a machine-learning model using one or more machine-learning algorithms), one or more performance thresholds (e.g., indicating the model should be trained until at least 90% accurate), one or more schemas defining the organization or structure of data provided by the entity associated with computing device 104, transformation data defining how a data set provided by the entity may be transformed into one or more different formats, or any suitable data that can be utilized to define a project and/or one or more operations associated with the project.

At 404, a digital signature may be generated for the project data (e.g., utilizing a private key associated with the computing device 104) and the project data and digital signature may be transmitted to the project management module 108.

At 406, the project management module 108 may forward the project data and digital signature to the project management module 130.

At 408, the project management module 130 may validate the project data utilizing the digital signature. For example, the project management module 130 may retrieve (e.g., from the data store 122) the public key associated with the client identifier provided as the providing entity in the project data (e.g., the identifier for client A, an entity corresponding to computing device 104). The public key can be utilized to verify/validate the digital signature. If the digital signature is invalid, the project management module 130 may reject the project data and execute operations to cause the notification module 114 to provide a notification to the computing device 104 indicating the project data was rejected (not depicted). If the digital signature is determined to be valid, the project management module 130 may execute operations to cause the project data to be stored in a data store (e.g., the data store 124 of FIG. 1).

The project management module 130 may identify that the project data indicates at least one other project participant (e.g., client B corresponding to computing device 106) for which project data has not been received. Upon making this determination, the project management module 130 may transmit any suitable data to notification module 114 at 410 to indicate that project data is needed from the other participant(s).

At 412, in response to receiving the indication the notification module 114 to transmit a notification to computing device 106 (e.g., a computing device associated with another project participant) requesting project data from the participant.

At 414, a digital signature may be generated for additional project data provided by the computing device 106 (e.g., utilizing a private key associated with the computing device 104) and the additional project data and digital signature may be transmitted to the project management module 108. The project data provided at 414 may include include permissive use information defining a task for the project (e.g., training and/or maintaining a machine-learning model using one or more machine-learning algorithms), one or more performance thresholds (e.g., indicating a model should be trained until at least 90% accurate), one or more schemas defining the organization or structure of data provided by the entity associated with computing device 106, transformation data defining how a data set provided by the entity may be transformed into one or more different formats, or any suitable data that can be utilized to define a project and/or one or more operations associated with the project.

At 416, the project management module 108 may forward the additional project data including the digital signature to the project management module 130.

At 418, the project management module 130 may validate the additional project data utilizing the digital signature. For example, the project management module 130 may retrieve (e.g., from the data store 122) the public key associated with the client identifier provided as the providing entity in the project data (e.g., the identifier for client B, an entity corresponding to computing device 106). The public key can be utilized to verify/validate the digital signature. If the digital signature is invalid, the project management module 130 may reject the project data and execute operations to cause the notification module 114 to provide a notification to the computing device 104 and/or computing device 106 indicating the project data was rejected (not depicted). If the digital signature is determined to be valid, the project management module 130 may execute operations to cause the project data to be stored in a data store (e.g., the data store 124 of FIG. 1).

At 420, the project management module 130 may check whether project data has been provided for all participants of the project. If project data is still need from more participants, the project management module 130 may cause the notification module 114 to send a notification to each of those participants for which project data is still needed.

At 422, if all participants have provided their corresponding project data, the project management module 130 may transmit data indicating the project has been successfully defined. Upon receiving this indication, the notification module 114 may be configured to transmit notifications to all participants that the project has been successfully defined (e.g., as depicted at 424 and 426).

Figure 5:
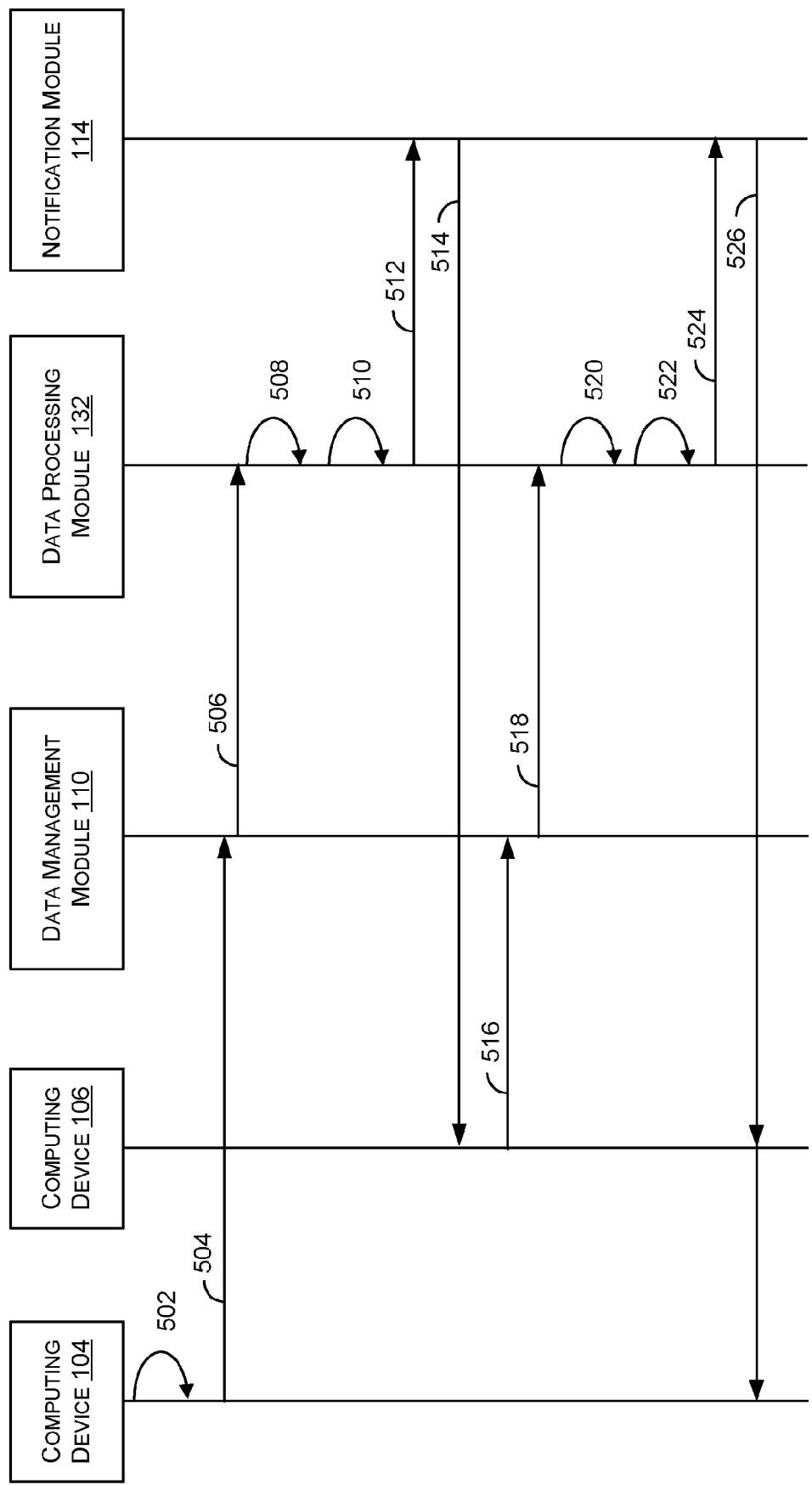
FIG. 5 shows a flow diagram illustrating a method for securely providing a data set for a federated project, according to some embodiments.

FIG. 5 shows a flow diagram illustrating a method 500 for securely providing a data set (e.g., training data) for a project, according to some embodiments. Method 500 may be performed with any suitable number of computing devices (e.g., computing device 104 and/or computing device 106 of FIG. 1), data management module 110 of FIGS. 1 and 2, notification module 114 of FIGS. 1 and 2, and data processing module 132 of FIGS. 1 and 2. Data management module 110 may execute in an unsecure memory space (e.g., computer readable medium 216 of FIG. 2) of a secure platform computer (e.g., the secure platform computer 202 of FIG. 2). The data processing module 132 may execute within a secure memory space such as the secure memory space 218 of FIG. 2 (e.g., an example of the enclave 120 of FIG. 1).

The method 500 may begin at 502, where a UI and/or API (e.g., the data upload UI/API 144) may be accessed via the computing device 104 to obtain a data set for the project. This data set provided by the computing device 104 may be a portion of training data needed to train a machine-learning model as defined by the project data. The data set may be transmitted from the computing device 104 to the data management module 110 at 504, which can in turn forward the data set to the data processing module 132. The data set may be transmitted with a project identifier identifying the project to which the data set pertains. In some embodiments, the data set transmitted at 504 and 506 may be encrypted using the public key associated with the secure platform computer on which the data processing module 132 executes. In some embodiments, a digital signature may be generated using the private key of associated with the computing device 104 and the digital signature may be transmitted with the encrypted data set.

At 508, the data processing module 132 may perform any suitable operations for verifying the digital signature using the public key associated with the computing device 104 (e.g., the public key retrieved from data store 122 and associated with computing device 104). In some embodiments, the data processing module 132 may also decrypt the data set using the private key associated with the secure platform computer on which the data processing module 132 executes.

At 510, the data processing module 132 may retrieve project data for the project corresponding to the project identifier. In some embodiments, the project data may be utilized to validate the format and/or values of the data set. By way of example, a schema of the project data may indicate the organization and structure of the data. As a simplistic example, the schema may identify particular data being of a particular data type and a set of valid values or a range of values. The data processing module 132 may perform any suitable number of checks to ensure that the data is in conformance with the schema. If the data is not in conformance with the schema provided, the data processing module 132 may reject the data and perform operations to cause the notification module 114 to transmit a notification to the computing device 104 that the data set was rejected. As another example, the data processing module 132 may utilize project data to perform any suitable transformations and/or conversions of data fields and/or values of the data set. For example, some data may not be formatted optimally for use with a particular machine-learning algorithm. The project data may identify a conversion that may be performed on the data to convert the data to a format best suited for a particular machine-learning algorithm. If the data set is not rejected, the data processing module 132 may generate a hash of the encrypted version of the data set. The hash and the encrypted version of the data set may be store in a new record of an immutable ledger (e.g., the immutable ledger 127 of FIGS. 1 and 2). A hash of the previous record may also be included in the new record as well as any suitable project data and the client identifier of the provider of the data set.

At 512, the data processing module 132 may identify that a data set has not yet been provided by another participant (e.g., entity B, associated with the computing device 106). Accordingly, the data processing module 132 may transmit data to the notification module 114 indicating the same.

At 514, in response to receiving the data at 512, the notification module 114 may transmit a notification to the computing device 106 (e.g., associated with another participant of the project) requesting the participant submit their corresponding data set for the project.

In response to the notification at 514, steps 516-522 may be executed. Steps 516-522 may be substantially similar to steps 504-510 but as related to computing device 106 instead of computing device 104.

At 524, the data processing module 132 may identify that a data set has been provided for each participant of the project. Accordingly, the data processing module 132 may transmit any suitable data to the notification module 114.

At 526, a notification indicating that all participants have provided their corresponding data sets for the project may be transmitted by the notification module 114 to each participant of the project (e.g., to computing device 104 and 106).

Figure 6:
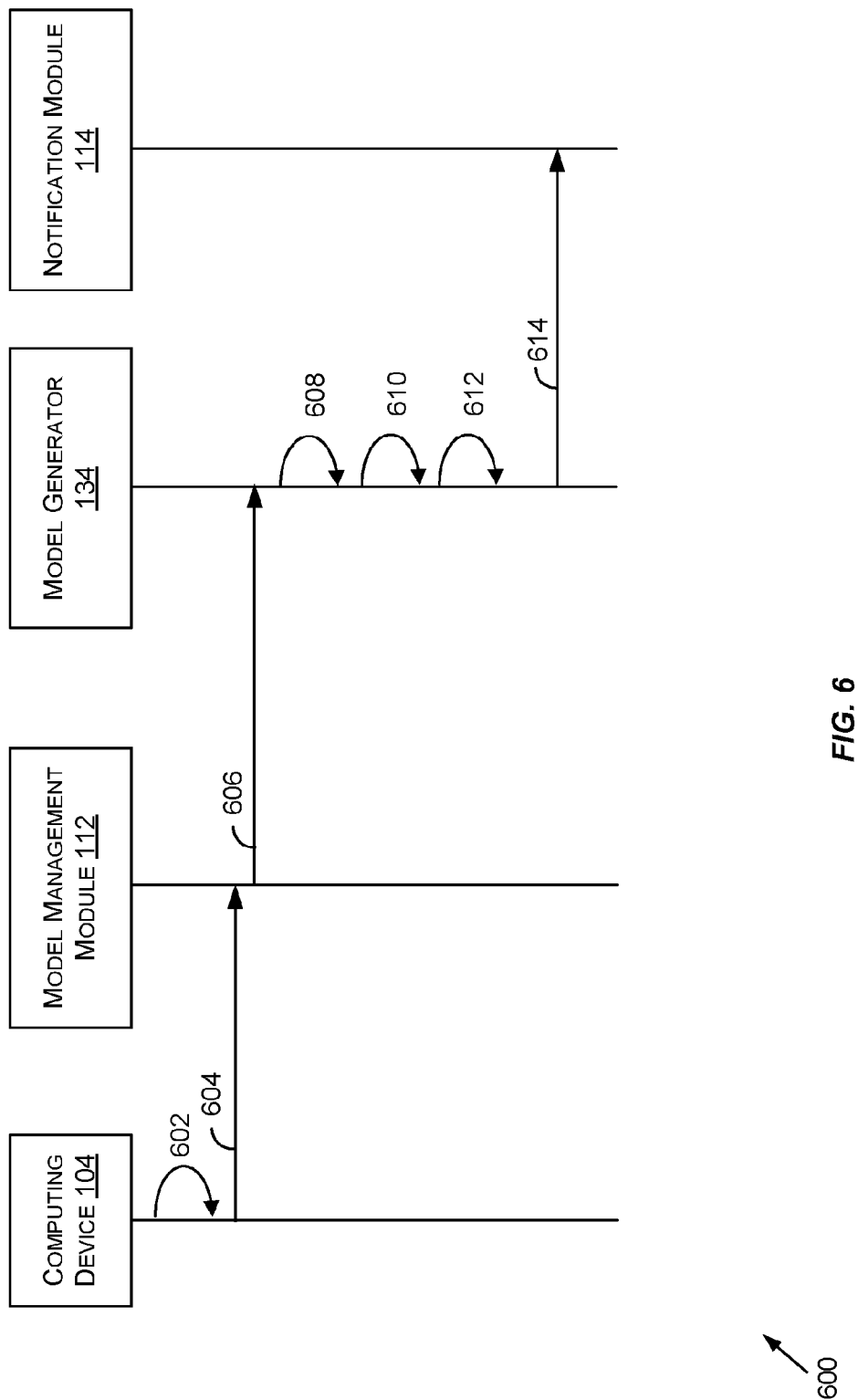
FIG. 6 shows a flow diagram illustrating a method for performing a federated task, according to some embodiments.

FIG. 6 shows a flow diagram illustrating a method for performing a secure federated task, according to some embodiments. Method 600 may be performed with any suitable number of computing devices (e.g., computing device 104), model management module 112 of FIGS. 1 and 2, notification module 114 of FIGS. 1 and 2, and model generator 134 of FIGS. 1 and 2. Model management module 112 may execute in an unsecure memory space (e.g., computer readable medium 216 of FIG. 2) of a secure platform computer (e.g., the secure platform computer 202 of FIG. 2). The model generator 134 may execute within a secure memory space such as the secure memory space 218 of FIG. 2 (e.g., an example of the enclave 120 of FIG. 1).

The method 600 may begin at 602, where a UI and/or API (e.g., the data upload UI/API 144) may be accessed via the computing device 104 to initiate performance of a task associated with a project. In some embodiments, the task may include generating one or more machine-learning models.

At 604, any suitable data (e.g., a task request) may be transmitted from the computing device 104 to the model management module 112. A task request may be in any suitable format. In some embodiments, the task request may include a project identifier corresponding to the project and a client identifier corresponding to the client (e.g., client A corresponding to the computing device 104). In some embodiments, the computing device 104 may generate a digital signature utilizing its private key and the digital signature may be sent in the task request.

At 606, the model management module 112 may forward the task request to the model generator 134.

At 608, may utilize the client identifier to retrieve a public key associated with the computing device 104 (e.g., from the data store 122 of FIG. 1). The public key associated with the computing device 104 may be utilized to verify the task request has not been modified and was, in fact, sent by the computing device 104. If the request cannot be verified, the request may be denied and the computing device 104 notified (e.g., by the notification module 114).

At 610, the project identifier of the task request may be utilized to retrieve the corresponding project data (e.g., stored in the data store 124 of FIG. 1). In some embodiments, the project data may be utilized to identify the particular task to be performed.

At 612, the model generator 134 may perform the particular task defined by the project data as corresponding to the entity associated with the computing device 104. By way of example, the project data may specify that the entity associated with computing device 104 specified that a particular machine-learning model was to be trained utilizing a particular machine-learning algorithm. Accordingly, the model generator 134 may retrieve the training data set provided in connection with FIG. 5 from the data store 124 and may proceed to train a machine-learning model utilizing the specified machine-learning algorithm and the training data set in accordance with the project definition. In some embodiments, the model generator 134 may be configured to ensure that the model is trained to meet any suitable performance threshold provided in the project data. That is, if the project data specifies the model is to be at least 90% accurate, the training process may be continued until the model is determined to be at least 90% accurate. To assess accuracy, the model generator 134 may utilize examples of the training data set for which output is already known as input data to the newly trained model. The model's accuracy may be calculated by identifying how many of the model's outputs match the expected outputs found in the project data. If the accuracy does not exceed the specified threshold, model training may be continued until the model's accuracy exceeds the specified threshold.

At 614, when model training is complete (or has failed), the model generator 134 may transmit any suitable data to the notification module 114 to cause the notification module 114 to transmit a notification to the computing device 104 indicating that the requested task (e.g., model training) has been completed. If for some reason, the training has failed, a notification may be provided to the computing device 104 indicating the same. The method 600 may be repeated any suitable number of times between the secure platform computer 102 of FIG. 1 and any suitable number of computing devices corresponding to entities that are associated with the project.

Any suitable project task may be similar effectuated as described above with respect to method 600. For example, an entity may utilize computing device 104 to request that a model be updated and/or retrained using a current training data set.

Figure 7:
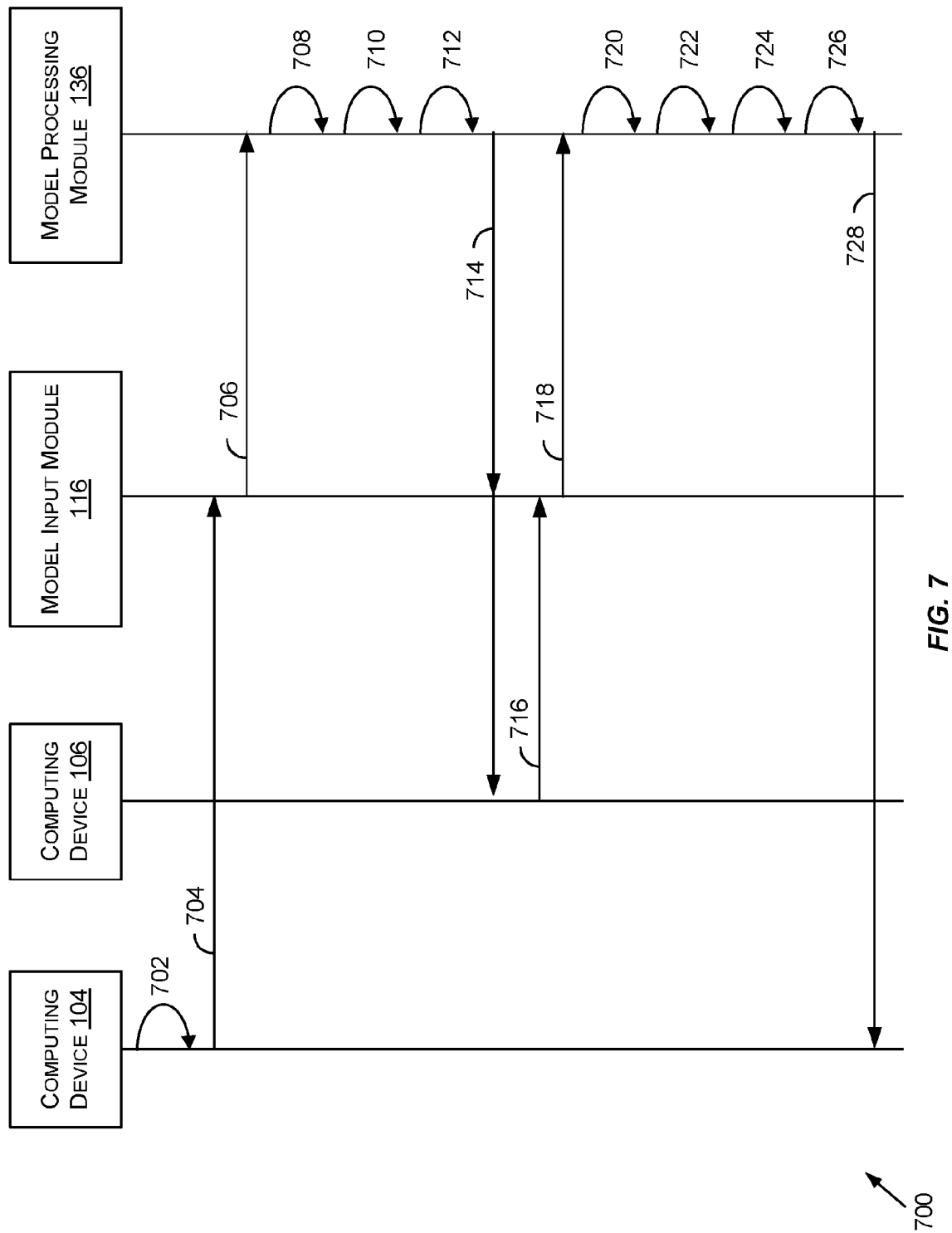
FIG. 7 shows a flow diagram illustrating a method for utilizing a federated machine-learning model, according to some embodiments.

FIG. 7 shows a flow diagram illustrating a method 700 for utilizing a federated machine-learning model, according to some embodiments. Method 700 may be performed with any suitable number of computing devices (e.g., computing device 104, the computing device 106, etc.), model input module 116 of FIGS. 1 and 2, notification module 114 of FIGS. 1 and 2, and model processing module 136 of FIGS. 1 and 2. Model input module 116 may execute in an unsecure memory space (e.g., computer readable medium 216 of FIG. 2) of a secure platform computer (e.g., the secure platform computer 202 of FIG. 2). The model processing module 136 may execute within a secure memory space such as the secure memory space 218 of FIG. 2 (e.g., an example of the enclave 120 of FIG. 1).

The method 700 may begin at 702, where a UI and/or API (e.g., the model input UI/API 148) may be accessed via the computing device 104 to request output data from a specific machine-learning model based at least in part on input data provided by the computing device 104.

At 704, the input data may be transmitted to the model input module 116 (e.g., via task request). The input data may be transmitted with a project identifier and a client identifier corresponding to the computing device 104. In some embodiments, the computing device 104 may generate a digital signature using its private key and the digital signature may be transmitted with the input data to the model input module 116. At 706, the input data, client identifier, project identifier, and digital signature may be forwarded by the model input module 116 to the model processing module 136. In some embodiments, any suitable portion of the input data, client identifier, project identifier, and digital signature may be encrypted using the public key of the secure platform computer on which model processing module 136 executes.

At 708, the model processing module 136 may obtain the private key of the secure platform computer on which it executes to decrypt the encrypted input data received.

At 710, the model processing module 136 may obtain the public key corresponding to the client identifier. The obtained public key may be utilized to verify the digital signature. That is, that the task request is unmodified and was in fact transmitted by the purported sender (e.g., the computing device 104). If verified, the model processing module 136 may proceed with processing the request.

At 712, the model processing module 136 may verify (e.g., utilizing one or more usage policies of the project data) that the entity associated with the client identifier is a participant of the project and allowed to utilize the model requested. If the entity associated with the client identifier is not a participant of the project and/or is not allowed to utilize the model requested, then the task request may be denied and the computing device 104 notified of the denial (e.g., by the model processing module 136 via the model input module 116, not depicted). A hash of the encrypted version of the input data may be generated and the hash and the encrypted version of the input data may be store in a new record of an immutable ledger (e.g., the immutable ledger 127 of FIGS. 1 and 2). A hash of the previous record may also be included in the new record as well as any suitable project data and the client identifier of the provider of the input data.

At 714, if the entity associated with the client identifier is a participant of the project and allowed to access the requested model (e.g., as determined from the project data/usage policies), the model processing module 136 may determine additional input data is needed from one or more other participants. For example, input data may be needed from a participant corresponding to the computing device 106. Accordingly, a request for input data may be transmitted by the model processing module 136 via the model input module 116. In some embodiments, this request may be received via the client API 156 of FIG. 1.

At 716, the computing device 106 may respond to the request by providing the requested input data, along with the project identifier, a client identifier associated with the entity corresponding to the computing device 106, and a digital signature generated with the private key of the computing device 106. The data transmitted at 714 may be encrypted using the public key of the secure platform computer on which model processing module 136 so that only the secure platform computer may be able to decrypt the data as only the secure platform computer would be in possession of the corresponding private key. The model input module 116 may forward the encrypted data to the model processing module 136 at 718.

At 720, the model processing module 136 may obtain the private key of the secure platform computer on which it executes to decrypt the encrypted data received at 718.

At 722, the model processing module 136 may obtain the public key corresponding to the client identifier associated with the computing device 106. The obtained public key may be utilized to verify the digital signature. That is, that the input data, project identifier, and client identifier is unmodified and was in fact transmitted by the purported sender (e.g., the computing device 106). If verified, the model processing module 136 may proceed with processing the request.

At 724, the model processing module 136 may verify (e.g., utilizing one or more usage policies of the project data) that the entity associated with the client identifier is a participant of the project and allowed to provide input data. If the entity associated with the client identifier is not a participant of the project and/or is not allowed to utilize the model requested, then the input data may be rejected and the computing device 104 notified of the rejection (e.g., by the model processing module 136 via the model input module 116, not depicted).

At 726, the model processing module 136 may determine that input data has been provided from every participant. Accordingly, the model processing module 136 may continue processing the task request received at 706. By way of example, the model processing module 136 may provide the input data received from computing devices 104 and 106 as input into a model specified in project data associated with the project.

At 728, the model processing module 136 may provide the output obtained from the model to the computing device 104 (e.g., the originator of the task request). A hash of the encrypted version of the output data may be generated and the hash and the encrypted version of the output data may be store in a new record of an immutable ledger (e.g., the immutable ledger 127 of FIGS. 1 and 2). A hash of the previous record may also be included in the new record as well as any suitable project data and the client identifier of the entity that requested the output data.

Figure 8:
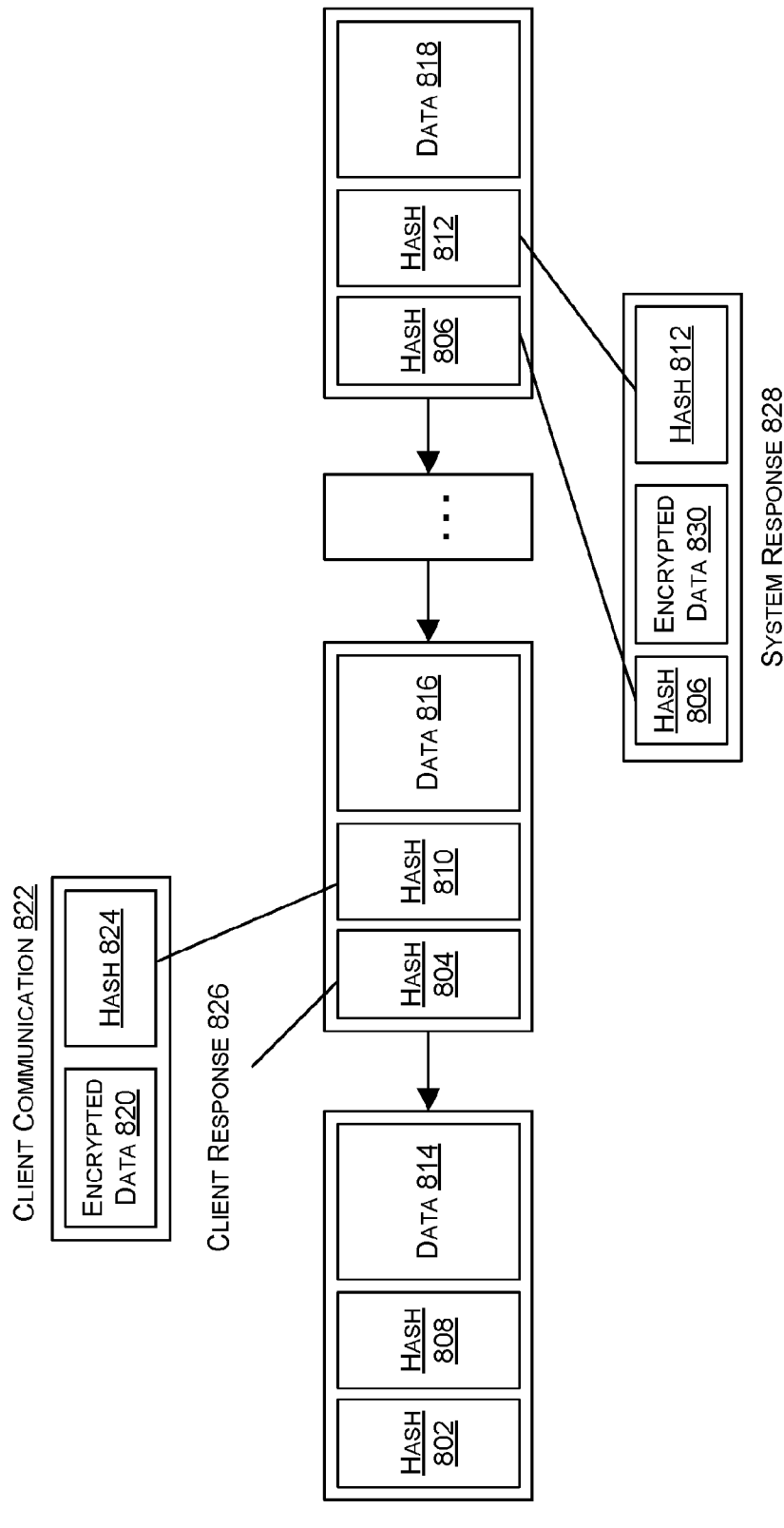
FIG. 8 shows a block diagram illustrating an exemplary immutable ledger 800, in accordance with at least one embodiment.

FIG. 8 shows a block diagram illustrating an exemplary immutable ledger 800, in accordance with at least one embodiment.

As discussed in the figures above, the immutable ledger 800 (an example of the immutable ledger 127 of FIGS. 1 and 2) may be maintained documenting all data sets and input data received by the secure platform computer 102 and all output data transmitted by the secure platform computer 102. The immutable ledger 127 may be in the form of a blockchain. A "blockchain" is a series of records (blocks) maintained according to a blockchain protocol. A full copy of a blockchain ledger may include every transaction ever executed by the system. Each entry (e.g., block) in the ledger may contain a hash of the previous entry. This has the effect of creating a chain of blocks from the genesis block to a current block. Each block is guaranteed to come after the previous block chronologically because the previous block's hash would otherwise not be known. Each block is also computationally impractical to modify once it has been in the chain for a while because every block after it would also have to be regenerated. These properties make a blockchain ledger relatively secure and tamper resistant.

The immutable ledger 800 may include any suitable number of records (blocks). Each block may include a hash of the previous block's contents. For example, hash 802, hash 804, and hash 806 may be hashes of the corresponding previous block's contents. A hash of the encrypted version of the data received/transmitted by the secure platform computer 102 may also be included in each block. For example, hashes 808, 810, and 812 individually represent a hash of a data set, input data, or output data received/transmitted by the secure platform computer 102. Still further each block may include a data portion (e.g., data 814, data 816, and data 818) including any suitable portion of project data for the project to which the encrypted data pertains, a task request corresponding to the encrypted data, and a client identifier associated with the requestor/provider of the encrypted data.

By way of example, encrypted data 820 (e.g., a data set) may be received in client communication 822, decrypted, and stored in secure memory (e.g., the enclave 120). Upon storing the decrypted data, the data processing module 132 may generate hash 824 by hashing the encrypted data 820 received in client communication 822. Hash 824 (an example of hash 810) may be stored in a block of the immutable ledger 800 as depicted. Project data corresponding to the project corresponding to the encrypted data 820 as well as the client identifier of the entity providing the encrypted data may be included as data 816. A hash of the previous block may be generated (e.g., hash 804) and included in the block. And a response (e.g., client response 826) may be provided which includes the hash 804 and a digital signature generated with the private key of the secure platform computer 102 to prove that the encrypted data 820 has successfully been stored in secure memory (e.g., the enclave 120 of FIG. 1).

At any suitable time, a participant of the project may request attestation of the secure platform computer 102 (e.g., by accessing the attestation UI/API 160 of FIG. 1). In some embodiments, the request (e.g., a task request) may be received by the data processing module 132 of FIGS. 1 and 2 which may be configured to validate the records (blocks) of the immutable ledger 127 by verifying the hashes of each block represent the hashes of the previous record (block). The data processing module 132 may provide system response 828 in response to the task request indicating the immutable ledger 127 was verified or not verified. As a non-limiting example, the system response 828 may include the hash of the most recent block (e.g., hash 806), the encrypted data 830 (e.g., the encrypted data corresponding to the hash 812), and the hash 812 (the hash of the encrypted data). In some embodiments, the data processing module 132 may generate a digital signature utilizing the private key associated with the secure platform computer 102 to certify that the immutable ledger 127 has been verified. The computing device may be configured to verify the digital signature. If the digital signature is verified (e.g., indicating the data has not been altered and the secure platform computer 102 sent the digital signature), the computing device can consider the immutable ledger 127 verified.

Figure 9:
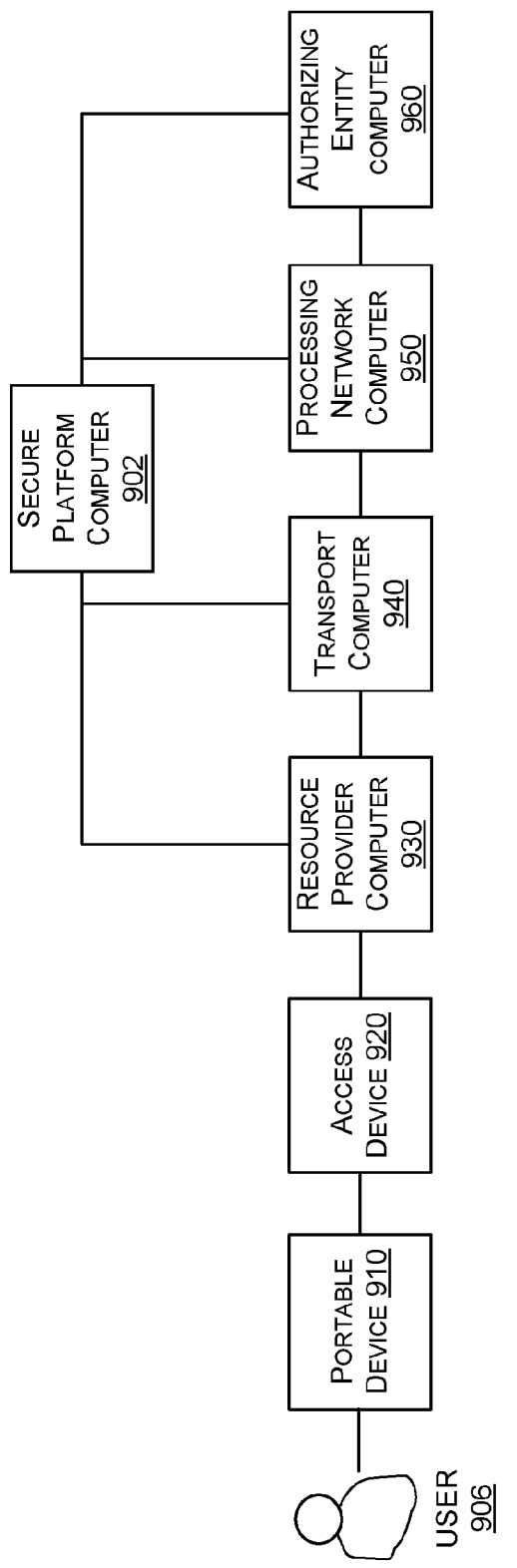
FIG. 9 shows a block diagram illustrating a transaction processing system.

FIG. 9 shows a block diagram illustrating a transaction processing system 900. FIG. 9 shows a user 906 that can operate a portable device 910 (e.g., a debit card, a credit card, a computing device configured with payment credentials, etc.). The user 906 may use the portable device 910 to pay for a good or service, such as a ticket, at a resource provider (e.g., a merchant). In some embodiments, the portable device 910 is a credit card or debit card issued by the authorizing entity. The resource provider may operate a resource provider computer 930 and/or an access device. The resource provider computer 930 may be configured to communicate with an authorizing entity computer 960 operated by, or on behalf of, an authorizing entity, via a transport computer 940 (operated by an acquirer) and a processing network computer 950 operating as part of a payment processing network.

The payment processing network may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. The payment processing network may use any suitable wired or wireless network, including the Internet.

A typical payment transaction can be described as follows, the user 906 will insert the portable device 910 (e.g., a debit card, a credit card, etc.) into an interface of the access device 920 (e.g., a card reader). In some embodiments, the portable device 910 may be held near the access device 920. The access device 920 may request payment credentials from the portable device 910 and transmit said payment credentials to the resource provider computer 930.

The resource provider computer 930 may then generate an authorization request message that includes at least a portion of the information received from the access device 920 and electronically transmits this message to a transport computer 940. The transport computer 940 may then receive, process, and forward the authorization request message to the authorizing entity computer 960 for authorization via the processing network computer 950.

In general, prior to the occurrence of a credit or debit-card transaction, the processing network computer 950 has an established protocol with each issuer on how the issuer's transactions are to be authorized. In some cases, such as when the transaction amount is below a threshold value, the processing network computer 950 may be configured to authorize the transaction based on information that it has about the user's account without generating and transmitting an authorization request message to the authorizing entity computer 960. In other cases, such as when the transaction amount is above a threshold value, the processing network computer 950 may receive the authorization request message, determine the issuer associated with the portable device 910, and forward the authorization request message for the transaction to the authorizing entity computer 960 for verification and authorization. Once the transaction is authorized, the authorizing entity computer 960 may generate an authorization response message (that may include an authorization code indicating the transaction is approved or declined) and transmit this electronic message (e.g., via an external communication interface) to processing network computer 950. The processing network computer 950 may then forward the authorization response message to the transport computer 940, which in turn may then transmit the electronic message to comprising the authorization indication to the resource provider computer 930, then to the remote computer 925, and then to the access device 920.

At the end of the day or at some other suitable time interval, a clearing and settlement process between the resource provider computer 930, the transport computer 940, the processing network computer 950, and/or the authorizing entity computer 960 may be performed on the transaction.

In some embodiments, any suitable number of the components of FIG. 9 may be configured to communicate with a secure platform computer 902 (e.g., an example of the secure platform computers 102 and 202 of FIGS. 1 and 2, respectively). As a non-limiting example, the processing network computer 950 associated with a processing network (e.g., entity A) and the authorizing entity computer 960 associated with an authorizing entity (e.g., entity B) may be in communication with the secure platform computer 902. The processing network computer 950 may be configured to generate and/or store transaction information (e.g., authorization request messages, authorization response messages, payment credentials, etc.) corresponding to any suitable number of transactions. The authorizing entity computer 960 may be configured to generate and/or store account data corresponding to one or more financial accounts associated with any suitable number of consumers (e.g., financial accounts corresponding to the payment credentials).

In some embodiments, the processing network (entity A) and the authorizing entity (entity B) may wish to utilize the secure platform computer 902 to participate in a federated project. By way of example, entity A and entity B may desire to generate a machine-learning algorithm utilizing an unsupervised machine-learning algorithm to predict future transaction amounts for future dates. Accordingly, entity A and entity B may utilize the UIs/APIs described in the above figures to exchange public keys with the secure platform computer 902. For example, method 300 of FIG. 3 may be executed.

Once keys are exchanged, entity A and entity B may utilize the UIs/APIs described above to define a project. Each entity may provide schemas defining the organization and/or structure of their data and/or one or more transformation rules for converting their data to one or more other formats and/or one or more restrictions on data usage. For example, entity A can specify that the entity B cannot use entity A's data to generate particular machine-learning algorithms or to perform another specified task. In some embodiments, the project data may be provided in accordance with method 400 of FIG. 4.

Once project data has been obtained from entity A and entity B, either the processing network computer 950 or the authorizing entity computer 960 may provide a data set for the project. As a non-limiting example, the processing network computer 950 may provide transaction data indicating any suitable number of transaction occurring over some period of time (e.g., the last year). In some embodiments, this data may be encrypted with the public key of the secure platform computer 902. The data may be digitally signed (e.g., may include a digital signature generated using the private key associated with the entity corresponding to the computer generating the digital signature). The data set may be processed in accordance with method 500 of FIG. 5 and a task may be performed. For example, a model may be generated in accordance with method 600 of FIG. 6. In some embodiments, one or more models may be generated for each entity. In some embodiments, these models may differ from one another and from the models generated for the other entity.

Once the project tasks (e.g., model generation/training) is complete, each of the entities (e.g., entity A and entity B) may provide input data to the generated model in order to predict future conditions. By way of example, entity A may provide new transaction data corresponding to the last week and entity B may provide new account data corresponding to accounts utilized in transaction occurring during the last week as input data to the model previously generated/trained by the secure platform computer 902. The secure platform computer 902 may provide this data as input to the machine-learning model to obtain output. The output may be provided to one or both entities. For example, the output may be provided to the entity that requested the output, in this case, entity A corresponding to the payment processor.

TECHNICAL ADVANTAGES

Embodiments of the invention have a number of advantages. For example, utilizing the techniques discussed above, any suitable number of entities may participate in secure federated projects in which data obtained from multiple entities may be collectively utilized to perform tasks without exposing each entity's corresponding data to the other participating entities. The secure platform computer described herein provides a federated environment in which data can be securely defined, provided, and stored such that only the secure platform computer has access to such data (e.g., project data defining the project, data sets corresponding to the project as provided by the participating entities of the project, etc.). The secure platform computer may additionally provide an attestation service with which the entities may verify that data provided to the secure platform computer has been securely stored and managed. The techniques provided herein provide efficiency improvements over decentralized federated machine-learning system that train a machine-learning model across decentralized devices that hold local data samples, without exchanging their samples. Such conventional systems may transmit a large number of messages back and forth as part of the model training process. By centralizing the data utilizing the secure platform computer disclosed herein, these messages may be entirely avoided.

Additionally, the techniques provided herein provide security improvements over decentralized federated machine-learning systems in which the training data set (e.g., comprising each entity's data set) may be distributed to each participant. Rather than storing data from other entities, which can introduce security and/or privacy concerns, the data of each entity is provided to the secure platform computer in such a way as to maintain its secrecy to all other participants of the project. The secure platform computer can ensure that complex machine-learning models may be generated (trained) without exposing the underlying data relied upon to generate such models.

Any of the computing devices described herein may be an example of a computer system that may be used to implement any of the entities or components described above. The subsystems of such a computer system may be are interconnected via a system bus. Additional subsystems include a printer, keyboard, storage device, and monitor, which is coupled to display adapter. Peripherals and input/output (I/O) devices, which couple to I/O controller, can be connected to the computer system by any number of means known in the art, such as a serial port. For example, I/O port or external interface can be used to connect the computer apparatus to a wide area network such as the Internet, a mouse input device, or a scanner. The interconnection via system bus may allow the central processor to communicate with each subsystem and to control the execution of instructions from system memory or the storage device, as well as the exchange of information between subsystems. The system memory and/or the storage device may embody a computer-readable medium.

As described, the inventive service may involve implementing one or more functions, processes, operations or method steps. In some embodiments, the functions, processes, operations or method steps may be implemented as a result of the execution of a set of instructions or software code by a suitably-programmed computing device, microprocessor, data processor, or the like. The set of instructions or software code may be stored in a memory or other form of data storage element which is accessed by the computing device, microprocessor, etc. In other embodiments, the functions, processes, operations or method steps may be implemented by firmware or a dedicated processor, integrated circuit, etc.

Any of the software components or functions described in this application may be implemented as software code to be executed by a processor using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a", "an" or "the" is intended to mean "at least one", unless specifically indicated to the contrary.

What is claimed is:

1. A computing device, comprising:
   one or more processors;
   a secure platform computer operating a secure memory space, the secure memory space comprising computer-executable instructions that, when executed by the one or more processors, causes the secure platform computer to:
   receive a first portion and a second portion of project data defining a federated project that comprises performing a machine-learning task utilizing data contributed by multiple participating entities, wherein respective data contributed during the federated project by each participating entity is kept private from all other participating entities, the first portion of the project data corresponding to a first participating entity and the second portion of the project data corresponding to a second participating entity;
   receive a first data set associated with the first participating entity and a second data set associated with the second participating entity;
   maintain, within the secure memory space of the computing device, an immutable ledger for the federated project, the immutable ledger comprising the first data set and the second data set by the secure platform computer, the first data set being inaccessible to the second participating entity while stored, the second data set being inaccessible to the first participating entity while stored;
   generate a machine-learning model based at least in part on the first data set corresponding to the first participating entity, the second data set corresponding to the second participating entity, and the project data; and
   provide access to the machine-learning model to the first participating entity and the second participating entity, the machine-learning model being stored within the secure memory space.

2. The computing device of claim 1, wherein the secure memory space is an enclave managed by a chip set of the one or more processors, wherein the enclave is encrypted by the chip set and accessible only by the chip set.

3. The computing device of claim 1, wherein executing the computer-executable instructions further causes the secure platform computer to:
   receive, from a requesting entity, a task request requesting the immutable ledger be verified;
   compare a first identifier of the requesting entity to a second identifier of the project data;
   when the first identifier matches the second identifier, verifying the immutable ledger; and
   providing, to the requesting entity, an indication that the immutable ledger was verified.

4. The computing device of claim 3, wherein the immutable ledger further comprises an identifier for a provider of the project data, and wherein executing the computer-executable instructions further causes the secure platform computer to verify that the provider of the project data corresponds to the first participating entity or the second participating entity.

5. The computing device of claim 3, wherein executing the computer-executable instructions further causes the secure platform computer to generate one or more first keys for retrieving the first data set from the secure memory space and one or more second keys for retrieving the second data set from the secure memory space.

6. The computing device of claim 5, wherein information maintained in the immutable ledger comprises first hash values corresponding to the one or more first keys and second hash values corresponding to the one or more second keys.

7. The computing device of claim 1, wherein executing the computer-executable instructions further causes the secure platform computer to:
   generate an additional machine-learning model based at least in part on the first data set, the second data set, and the project data; and
   provide access to the additional machine-learning model for the first participating entity, the additional machine-learning model being stored within the secure memory space.

8. The computing device of claim 1, wherein executing the computer-executable instructions further causes the secure platform computer to:
   transmit a notification to the second participating entity in response to receiving the first portion of the project data, the notification being transmitted prior to receiving the second portion of the project data, wherein the notification indicates receipt of the first portion of the project data.

9. The computing device of claim 1, wherein the first data set is inaccessible by the second participating entity and wherein the second data set is inaccessible by the first participating entity.

10. The computing device of claim 1, wherein executing the computer-executable instructions further causes the secure platform computer to transmit a notification to the first participating entity and the second participating entity, wherein the notification indicates generation of the machine-learning model is complete.

11. The computing device of claim 1, wherein executing the computer-executable instructions further causes the secure platform computer to:
    receive, from a corresponding computing device of the first participating entity, a task request indicative of a request to update the machine-learning model;
    update the machine-learning model utilizing a data set comprising the first data set, the second data set, and subsequent data received after receipt of the first data set and the second data set; and transmit, to the computing device of the first participating entity, a notification indicating the task request was successful or unsuccessful.

12. The computing device of claim 1, wherein the immutable ledger further stores the project data, a task request associated with the federated project, and an identifier of an entity that initiated the task request.

13. A computing device, comprising:
one or more processors; and
a secure platform computer operating a secure memory space, the secure memory space comprising computer-executable instructions that, when executed by the one or more processors, causes the secure platform computer to:
receive a first portion and a second portion of project data defining a federated project that comprises performing a machine-learning task utilizing data contributed by multiple participating entities, wherein respective data contributed during the federated project by each participating entity is kept private from all other participating entities, the first portion of the project data corresponding to a first participating entity and the second portion of the project data corresponding to a second participating entity;
receive a first data set associated with the first participating entity and a second data set associated with the second participating entity;
generate a machine-learning model based at least in part on the first data set corresponding to the first participating entity, the second data set corresponding to the second participating entity, and the project data;
provide access to the machine-learning model to the first participating entity and the second participating entity, the machine-learning model being stored within the secure memory space.

14. The computing device of claim 13, wherein executing the computer-executable instructions further causes the secure platform computer to:
maintain, in the secure memory space, an immutable ledger comprising an identifier for a provider of the project data, and
verify that the provider of the project data corresponds to the first participating entity or the second participating entity.

15. The computing device of claim 13, wherein executing the computer-executable instructions further causes the secure platform computer to generate one or more first keys for retrieving the first data set from the secure memory space and one or more second keys for retrieving the second data set from the secure memory space.

16. The computing device of claim 13, wherein executing the computer-executable instructions further causes the secure platform computer to:
generate an additional machine-learning model based at least in part on the first data set, the second data set, and the project data; and
provide access to the additional machine-learning model for the first participating entity, the additional machine-learning model being stored within the secure memory space.

17. The computing device of claim 13, wherein executing the computer-executable instructions further causes the secure platform computer to:
transmit a notification to the second participating entity in response to receiving the first portion of the project data, the notification being transmitted prior to receiving the second portion of the project data, wherein the notification indicates receipt of the first portion of the project data.

18. The computing device of claim 13, wherein the first data set is inaccessible by the second participating entity and wherein the second data set is inaccessible by the first participating entity.

19. The computing device of claim 13, wherein executing the computer-executable instructions further causes the secure platform computer to:
receive, from a corresponding computing device of the first participating entity, a task request indicative of a request to update the machine-learning model;
update the machine-learning model utilizing a data set comprising the first data set, the second data set, and subsequent data received after receipt of the first data set and the second data set; and
transmit, to the computing device of the first participating entity, a notification indicating the task request was successful or unsuccessful.

20. The computing device of claim 13, wherein executing the computer-executable instructions further causes the secure platform computer to maintain, in an immutable ledger of the secure memory space, the project data, a task request associated with the federated project, and an identifier of an entity that initiated the task request.

* * * * *